United States Patent
van Egmond et al.

(10) Patent No.: US 7,479,468 B2
(45) Date of Patent: Jan. 20, 2009

(54) INTEGRATING AN AIR SEPARATION UNIT INTO AN OXYGENATE-TO-OLEFINS REACTION SYSTEM

(75) Inventors: Cor F. van Egmond, Pasadena, TX (US); Eric D. Nelson, Houston, TX (US); Lawrence C. Smith, Houston, TX (US); Ronald G. Searle, Houston, TX (US); James H. Beech, Jr., Kingwood, TX (US); Michael P. Nicoletti, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 518 days.

(21) Appl. No.: 10/825,569

(22) Filed: Apr. 15, 2004

(65) Prior Publication Data

US 2005/0234278 A1 Oct. 20, 2005

(51) Int. Cl.
*B01J 20/34* (2006.01)
(52) U.S. Cl. ...................................................... 502/52
(58) Field of Classification Search ................... 502/38, 502/39, 41, 52, 53, 514
See application file for complete search history.

(56) References Cited

U.S. PATENT DOCUMENTS

| 3,968,036 | A | | 7/1976 | Liles et al. .................... 201/15 |
|---|---|---|---|---|
| 4,479,876 | A | | 10/1984 | Fuchs ......................... 210/605 |
| 5,232,474 | A | | 8/1993 | Jain .............................. 55/26 |
| 5,406,786 | A | | 4/1995 | Scharpf et al. ............. 60/39.05 |
| 5,454,227 | A | | 10/1995 | Straub et al. .................... 62/25 |
| 5,457,077 | A | * | 10/1995 | Williamson et al. ........... 502/37 |
| 5,560,763 | A | | 10/1996 | Kumar .......................... 95/98 |
| 6,134,916 | A | | 10/2000 | Jahnke ......................... 62/648 |
| 6,282,901 | B1 | | 9/2001 | Marin et al. .................. 60/649 |
| 6,345,493 | B1 | | 2/2002 | Smith et al. ................ 60/39.02 |
| 6,403,855 | B1 | * | 6/2002 | Mertens ...................... 585/640 |
| 6,534,551 | B2 | | 3/2003 | Allam et al. ................ 518/700 |
| 6,541,415 | B2 | * | 4/2003 | Vaughn et al. .............. 502/214 |
| 6,568,207 | B1 | | 5/2003 | Brugerolle et al. ............ 62/643 |
| 2003/0004384 | A1 | | 1/2003 | Coute et al. ................. 585/639 |
| 2004/0259961 | A1 | | 12/2004 | O'Rear ....................... 518/726 |

FOREIGN PATENT DOCUMENTS

| EP | 0 357 831 | 3/1990 |
|---|---|---|
| EP | 0 604 689 | 7/1994 |
| EP | 0 748 763 | 12/1996 |
| EP | 0 930 268 | 7/1999 |
| WO | WO 03/106346 | 12/2003 |

OTHER PUBLICATIONS

Menon R e tal, "Proper Choice of 02 Supply Enhances Enrichment Benefits FCC 02 Enrichment—Part 1," Oil and Gas Journal, Pennwell Publishing Co., Tulsa, US, vol. 94, No. 9, Feb. 26, 1996, pp. 54, 56-59.

Integrated Gasification Combined Cycle, *"Greenhouse Gas Emissions From Power Stations"*, pp. 1-5, accessed on Aug. 4, 2003 from http://www.ieagreen.org.uk/emis6.htm.

Nikolopoulos, et al, *"Single-step Sulfur Recovery Process (SSRP)"*, 19th Annual International Pittsburgh Coal Conference, pp. 1-6, accessed on Sep. 15, 2003 from www.netl.doe.gov/coalpower/gasification/projects/product-util/docs/anikolop_PCC_0902.

*"Waste Water and Sludge Treatment"*, pp. 1-13, accessed on Mar. 16, 2004 from http://www.linde-process-engineering.com/en/p0001/p0052/p0053/p0053.jsp#1.

U.S. Appl. No. 10/716,894, filed Nov. 19, 2003 (Inventors: Cor f. van Egmond, Andrew Argo, Teng Xu, Marcel Janssen, & Jaimes Sher), entitled "Methanol and Ethanol Production for an Oxygenate to Olefin Reaction System".

U.S. Appl. No. 10/260,263, filed Sep. 30, 2002 (Inventors: James H. Beech, Jr., Mike Nicoletti, James Lattner, Dennis G. Alexion, & Peter K. Paik), entitled "Method and System for Regenerating Catalyst from a Plurality of Hydrocarbon Conversion Apparatuses".

PCT Patent Application No. PCT/US03/16073, filed May 16, 2003 (Inventors: James H. Beech, Jr., James R. Lattner, Dennis G. Alexion, Peter K. Paik, & Michael Nicoletti), entitled "Method and System for Regenerating Catalyst from a Plurality of Hydrocarbon Conversion Apparatuses".

U.S. Appl. No. 60/436,925, filed Dec. 30, 2002 (Inventor: Cor van Egmond), entitled "Integration of a Methanol Synthesis System with a Methanol to Olefin Reaction System".

U.S. Appl. No. 10/382,677, filed Mar. 6, 2003 (Inventor: Cor van Egmond), entitled "Integration of a Methanol Synthesis System with a Methanol to Olefin Reaction System".

U.S. Appl. No. 10/403,271, filed Mar. 28, 2003 (Inventor: Cor van Egmond), entitled "Integration of a Methanol Synthesis System with a Methanol to Olefin Reaction System".

U.S. Appl. No. 10/642,074, filed Aug. 15, 2003 (Inventors: Cor van Egmond, David J. Duhon, & Jaimes Sher), entitled "Integrating a Methanol to Olefin Reaction System with a Steam Cracking System".

U.S. Appl. No. 10/716,685, filed Nov. 19, 2003 (Inventors: Marcel Janssen, Cor van Egmond, Luc Martens & Jaimes Sher), entitled Methanol and Fuel Alcohol Production for an Oxygenate to Olefin Reaction System.

U.S. Appl. No. 10/717,006, filed Nov. 19, 2003 (Inventors: Jaimes Sher & Cor van Egmond), entitled "Controlling the Ratio of Ethylene to Propylene Produced in a Methanol/Ethanol Conversion Process".

U.S. Appl. No. 10/729,568, filed Dec. 5, 2003 (Inventors: Keith Kuechler, Nicolas P. Coute, Jeffrey S. Smith, Stephen Harold Brown, Richard B. Hall, Teng Xu & Stephen Neil Vaughn), entitled "Catalyst Fluidization in Oxygenate to Olefin Reaction Systems".

* cited by examiner

*Primary Examiner*—Edward M. Johnson

(57) ABSTRACT

This invention provides an integrated system and process for forming light olefins and polymers from oxygenates, and optionally from natural gas. The integrated system includes an air separation unit, which separates air components into an oxygen stream and a nitrogen stream, and which also forms a compressed air stream. According to the present invention, the oxygen stream, the nitrogen stream and/or the compressed air stream from the air separation unit may serve as a reactant in syngas generation, as a regeneration medium in the methanol-to-olefins reaction system, as a fluidizing stream, as a blanketing medium, as a stripping medium, as instrument air, and/or as a reactant in a sulfur removal unit.

28 Claims, 5 Drawing Sheets

US 7,479,468 B2

INTEGRATING AN AIR SEPARATION UNIT INTO AN OXYGENATE-TO-OLEFINS REACTION SYSTEM

FIELD OF THE INVENTION

The present invention relates to oxygenate-to-olefins reaction systems. More particularly, the invention relates to integrating an air separation unit into an oxygenate-to-olefins reaction system.

BACKGROUND OF THE INVENTION

Light olefins, defined herein as ethylene and propylene, individually or collectively, serve as feeds for the production of numerous chemicals. Olefins traditionally are produced by petroleum cracking. Because of the limited supply and/or the high cost of petroleum sources, the cost of producing olefins from petroleum sources has increased steadily.

Alternative feedstocks for the production of light olefins are oxygenates, such as alcohols, particularly methanol, dimethyl ether, and ethanol. Alcohols may be produced by fermentation, or from synthesis gas derived from natural gas, petroleum liquids, carbonaceous materials, including coal, recycled plastics, municipal wastes, or any organic material. Because of the wide variety of sources, alcohol, alcohol derivatives, and other oxygenates have promise as an economical, non-petroleum source for olefin production.

Typically, the catalysts employed to promote the conversion of oxygenates to olefins are molecular sieve catalysts. Because ethylene and propylene are the most sought after products of such a reaction, research has focused on what catalysts are most selective to ethylene and/or propylene, and on methods for increasing the life and selectivity of the catalysts to ethylene and/or propylene.

The conversion of oxygenates to olefins in a hydrocarbon conversion apparatus (HCA) generates and deposits carbonaceous material (coke) on the molecular sieve catalysts used to catalyze the conversion process. Excessive accumulation of these carbonaceous deposits will interfere with the catalyst's ability to promote the reaction. In order to avoid unwanted build-up of coke on molecular sieve catalysts, the oxygenate to olefin process incorporates a second step comprising catalyst regeneration. During regeneration, the coke contacts oxygen in a regeneration medium, typically air, under conditions effective to at least partially remove the coke from the catalyst by combustion thereby restoring the catalytic activity of the catalyst. The regenerated catalyst then may be reused to catalyze the conversion of oxygenates to olefins.

Typically, oxygenate to olefin conversion and regeneration are conducted in separate vessels. Coked catalyst used for conversion is continuously withdrawn from the HCA and directed to a catalyst regenerator, wherein the regeneration process occurs, and regenerated catalyst is continuously withdrawn from the catalyst regenerator and returned to the reaction HCA to facilitate conversion of oxygenates to light olefins.

Due to the typically substantial volume of coked catalyst processed by catalyst regenerators, catalyst regenerators may be very large vessels, oftentimes approaching the size of the HCA itself. Thus, the need also exists for reducing the size of catalyst regenerators associated with OTO reaction processes.

SUMMARY OF THE INVENTION

The present invention provides for integrating an air separation unit (ASU) into an oxygenate to olefin (OTO) reaction system. The ASU separates air into an oxygen stream and a nitrogen stream and optionally an argon stream, and also forms a compressed air stream. According to the present invention, the oxygen stream, the nitrogen stream and/or the compressed air stream from the air separation unit may serve as a regeneration medium in the OTO reaction system, as a reactant in syngas generation (e.g., in autothermal reforming, partial oxidation reforming, or catalytic partial oxidation reforming), as a stripping medium, as a fluidization agent, as a blanketing medium, as a reactant in a sulfur removal unit, in a waste water treatment process, or in other steps in the OTO conversion process, the polymerization process or a methanol synthesis process.

In a preferred embodiment, the oxygen stream, which is nitrogen-depleted, serves as the regeneration medium. By utilizing the oxygen stream from the ASU as the regeneration medium, the amount of undesirable $NO_x$ compounds formed in the regeneration process can be advantageously reduced (if, for example, the regenerator operates at extreme temperature conditions, e.g., on the order of more than about 1500° F. (816° C.)). Further, by reducing the amount of nitrogen that is fed to the catalyst regenerator, the size of the regeneration unit can be smaller than conventional catalyst regenerators.

Thus, in one embodiment, the invention is to a process for regenerating catalyst in a reaction system, preferably an OTO reaction system. The process includes a step of contacting an oxygenate with a molecular sieve catalyst composition in a reactor under conditions effective to convert the oxygenate to light olefins and to form an at least partially coked molecular sieve catalyst composition. The at least partially coked molecular sieve catalyst composition is directed from the reactor to a catalyst regenerator. An oxygen-containing regeneration medium is directed from an air separation unit to the catalyst regenerator. The regeneration medium contacts the at least partially coked molecular sieve catalyst composition in the catalyst regenerator under conditions effective to at least partially regenerate the at least partially coked molecular sieve catalyst composition and form a regenerated catalyst composition. The regenerated catalyst composition is then directed from the catalyst regenerator to the reactor.

In another embodiment, the invention is to an integrated process for forming methanol and light olefins. In the process, air components are separated in an air separation unit to form an oxygen stream and a nitrogen stream. The air separation unit also forms a compressed air stream. Natural gas contacts at least a portion of the oxygen stream in a syngas generator under conditions effective to convert the natural gas to syngas. The syngas contacts a first catalyst composition in a methanol synthesis unit under conditions effective to convert at least a portion of the syngas to methanol. The methanol contacts a molecular sieve catalyst composition in a reactor under conditions effective to convert the methanol to light olefins and to form an at least partially coked molecular sieve catalyst composition. The light olefins are yielded from the reactor in an effluent stream. The at least partially coked molecular sieve catalyst composition is directed from the reactor to a catalyst regenerator. The at least partially coked molecular sieve catalyst composition contacts a first regeneration medium in the catalyst regenerator under conditions effective to convert the at least partially coked molecular sieve catalyst composition to a regenerated molecular sieve catalyst composition, wherein the first regeneration medium comprises at least a portion of the oxygen stream or at least a portion of the compressed air stream. The regenerated molecular sieve catalyst composition is then directed to the reactor.

In another embodiment, the invention is to a process for forming light olefins from an integrated reaction system in which catalyst is fluidized with a fluidizing stream from an ASU. The invention includes a step of separating air components in an air separation unit to form an oxygen stream and a nitrogen stream, wherein the air separation unit also forms a compressed air stream. Natural gas contacts at least a portion of the oxygen stream in a syngas generator under conditions effective to convert the natural gas to syngas. The syngas contacts a first catalyst composition in a methanol synthesis unit under conditions effective to convert at least a portion of the syngas to methanol. The methanol contacts a molecular sieve catalyst composition in a reaction zone under conditions effective to convert the methanol to light olefins. The light olefins and the molecular sieve catalyst composition are directed to a disengaging zone, from which an effluent stream comprising the light olefins from the disengaging zone is yielded. The molecular sieve catalyst composition is directed to a standpipe, in which the molecular sieve catalyst composition contacts a first fluidizing stream under conditions effective to transport the molecular sieve catalyst composition in a fluidized manner from the standpipe to the reaction zone. The first fluidizing stream comprises at least a portion of the oxygen stream, at least a portion of the nitrogen stream or at least a portion of the compressed air stream.

In another embodiment, the invention is to a process for forming light olefins from an integrated reaction system and for converting $H_2S$ in a natural gas-containing stream to elemental sulfur. In this embodiment, the invention includes a step of separating air components in an air separation unit to form an oxygen stream and a nitrogen stream, wherein the air separation unit also forms a compressed air stream. A natural gas-containing stream comprising natural gas and the $H_2S$ is provided. A majority of the $H_2S$ is separated from the natural gas-containing stream to form a separated $H_2S$-containing stream. The separated $H_2S$-containing stream contacts a portion of the oxygen stream or a portion of the compressed air stream (or a combination of the two streams) under conditions effective to convert a portion of the $H_2S$ in the separated $H_2S$-containing stream to $SO_2$. The $SO_2$ contacts residual $H_2S$ in the presence of a catalyst composition under conditions effective to form elemental sulfur and water. The natural gas in the natural gas-containing stream contacts at least a portion of the oxygen stream in a syngas generator under conditions effective to convert the natural gas to syngas. The syngas contacts a first catalyst composition in a methanol synthesis unit under conditions effective to convert at least a portion of the syngas to methanol. The methanol contacts a molecular sieve catalyst composition in a reactor under conditions effective to convert the methanol to light olefins.

In another embodiment, the invention is to a process for forming a polymer. This process includes a step of separating air components in an air separation unit to form an oxygen stream and a nitrogen stream, wherein the air separation unit also forms a compressed air stream. An oxygenate contacts a molecular sieve catalyst composition in an oxygenate-to-olefins reaction system under conditions effective to convert the oxygenate to light olefins. An effluent stream comprising the light olefins is yielded from the oxygenate-to-olefins reaction system. At least a portion of the nitrogen stream is combined with at least a portion of the effluent stream to form a polymerization feedstock. A polymerization catalyst contacts the polymerization feedstock in a polymerization unit under conditions effective to form the polymer.

In another embodiment, the invention is to an integrated reaction system for forming light olefins. The integrated system includes an air separation unit comprising one or more separation columns for separating air into an oxygen stream and a nitrogen stream, wherein the air separation unit also forms a compressed air stream. The system also includes a syngas generator in which natural gas contacts at least a portion of the oxygen stream under conditions effective to convert the natural gas to syngas. The system also includes a methanol synthesis unit in fluid communication with the syngas generator, wherein the syngas contacts a first catalyst composition in the methanol synthesis unit under conditions effective to convert at least a portion of the syngas to methanol. The system also includes a methanol-to-olefins reaction unit in fluid communication with the methanol synthesis unit, wherein the methanol contacts a molecular sieve catalyst composition in the methanol-to-olefins reaction unit under conditions effective to convert the methanol to light olefins and to form an at least partially coked molecular sieve catalyst composition. The system also includes a catalyst regenerator in fluid communication with the methanol-to-olefins reaction unit, wherein the at least partially coked molecular sieve catalyst composition contacts a regeneration medium in the catalyst regenerator under conditions effective to convert the at least partially coked molecular sieve catalyst composition to a regenerated molecular sieve catalyst composition, wherein the catalyst regenerator is in fluid communication with the air separation unit, and wherein the regeneration medium comprises at least a portion of the oxygen stream or at least a portion of the compressed air stream.

BRIEF DESCRIPTION OF THE DRAWINGS

Various embodiments of the overall invention are shown by way of example in the attached non-limiting figures, wherein.

DETAILED DESCRIPTION OF THE INVENTION

A. Introduction

Figure 1:
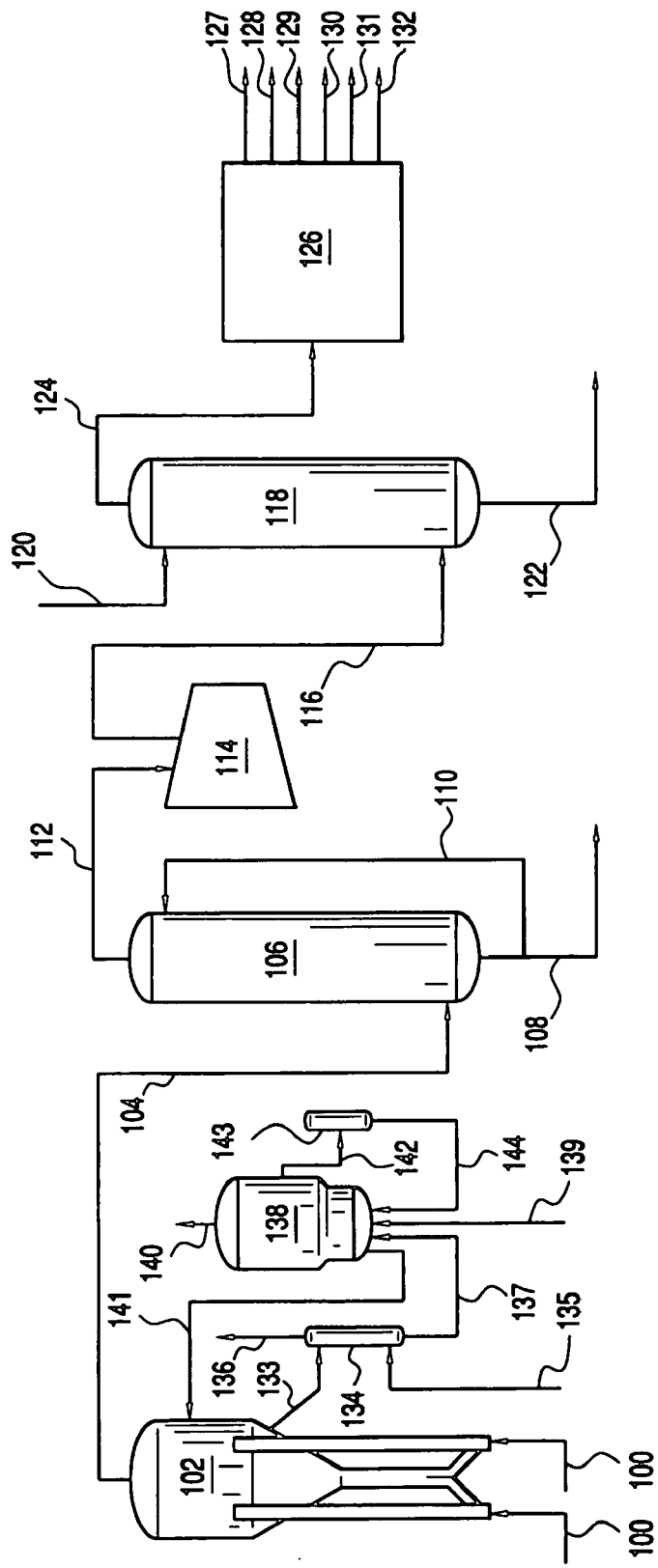
FIG. 1 presents a flow diagram illustrating an oxygenate to olefin reaction system, which includes a catalyst stripping and regeneration system, and an effluent processing system.

The present invention provides for integrating an air separation unit (ASU) into an oxygenate-to-olefins (OTO) reaction system, which may include a polymerization system and/or a methanol synthesis system. The ASU separates air into an oxygen stream and a nitrogen stream, and optionally an argon stream, and also forms a compressed air stream. According to the present invention, the oxygen stream, the nitrogen stream and/or the compressed air stream from the air separation unit may serve as a reactant in syngas generation (e.g., in autothermal reforming, partial oxidation reforming, or catalytic partial oxidation reforming), as a regeneration medium in the OTO reaction system, as a fluidization agent, as a blanketing medium, as a reactant in a sulfur removal unit, as an oxygen source in aerobic waste water treatment, and/or may be used for a variety of other purpose described in more detail herein.

In a preferred embodiment, the oxygen stream, which is nitrogen-depleted, serves as the regeneration medium. By reducing the amount of nitrogen that is fed to the catalyst regenerator, more efficient catalyst regeneration can be achieved, and the size of the regeneration unit can be made smaller than conventional catalyst regenerators.

B. OTO Reaction Systems

The present invention, in one embodiment, provides for combining an ASU with an OTO reaction system, which is discussed in more detail hereinafter. As used herein, "reaction system" means a system comprising a reactor, optionally a catalyst regenerator, optionally a catalyst cooler and optionally a catalyst stripper. The reactor comprises a reaction unit, which defines a reaction zone, and optionally a disengaging unit, which defines a disengaging zone.

Typically, molecular sieve catalysts have been used to convert oxygenate compounds to light olefins. Ideally, the molecular sieve catalyst composition comprises an alumina or a silica-alumina catalyst composition. Silicoaluminophosphate (SAPO) molecular sieve catalysts are particularly desirable in such conversion processes, because they are highly selective in the formation of ethylene and propylene. A non-limiting list of preferable SAPO molecular sieve catalyst compositions includes SAPO-17, SAPO-18, SAPO-34, SAPO-35, SAPO-44, the substituted forms thereof, and mixtures thereof. Preferably, the molecular sieve catalyst composition comprises a molecular sieve selected from the group consisting of: SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AEI/CHA intergrowths, metal containing forms thereof, intergrown forms thereof, and mixtures thereof.

The feedstock that is directed to an OTO reaction system optionally contains one or more aliphatic-containing compounds such as alcohols, amines, carbonyl compounds for example aldehydes, ketones and carboxylic acids, ethers, halides, mercaptans, sulfides, and the like, and mixtures thereof. The aliphatic moiety of the aliphatic-containing compounds typically contains from 1 to about 50 carbon atoms, preferably from 1 to 20 carbon atoms, more preferably from 1 to 10 carbon atoms, and more preferably from 1 to 4 carbon atoms, and most preferably methanol.

Non-limiting examples of aliphatic-containing compounds include: alcohols such as methanol and ethanol, alkyl-mercaptans such as methyl mercaptan and ethyl mercaptan, alkyl-sulfides such as methyl sulfide, alkyl-amines such as methyl amine, alkyl-ethers such as DME, diethyl ether and methylethyl ether, alkyl-halides such as methyl chloride and ethyl chloride, alkyl ketones such as dimethyl ketone, alkyl-aldehydes such as formaldehyde and acetaldehyde, and various acids such as acetic acid.

In a preferred embodiment of the process of the invention, the feedstock contains one or more organic compounds containing at least one oxygen atom. In the most preferred embodiment of the process of invention, the oxygenate in the feedstock comprises one or more alcohols, preferably aliphatic alcohols where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts. Non-limiting examples of oxygenates include methanol, ethanol, n-propanol, isopropanol, methyl ethyl ether, DME, diethyl ether, di-isopropyl ether, formaldehyde, dimethyl carbonate, dimethyl ketone, acetic acid, and mixtures thereof. In the most preferred embodiment, the feedstock comprises one or more of methanol, ethanol, DME, diethyl ether or a combination thereof.

The various feedstocks discussed above are converted primarily into one or more olefins. The olefins or olefin monomers produced from the feedstock typically have from 2 to 30 carbon atoms, preferably 2 to 8 carbon atoms, more preferably 2 to 6 carbon atoms, still more preferably 2 to 4 carbons atoms, and most preferably ethylene and/or propylene.

Non-limiting examples of olefin monomer(s) include ethylene, propylene, butene-1, pentene-1, 4-methyl-pentene-1, hexene-1, octene-1 and decene-1, preferably ethylene, propylene, butene-1, pentene-1, 4-methyl-pentene-1, hexene-1, octene-1 and isomers thereof. Other olefin monomers include unsaturated monomers, diolefins having 4 to 18 carbon atoms, conjugated or nonconjugated dienes, polyenes, vinyl monomers and cyclic olefins.

In a preferred embodiment, the feedstock, which ideally contains methanol, is converted in the presence of a molecular sieve catalyst composition into olefin(s) having 2 to 6 carbons atoms, preferably 2 to 4 carbon atoms. Most preferably, the olefin(s), alone or combination, are converted from a feedstock containing an oxygenate, preferably an alcohol, most preferably methanol, to the preferred olefin(s) ethylene and/or propylene.

The most preferred process is generally referred to as an oxygenate-to-olefins (OTO) reaction process. In an OTO process, typically an oxygenated feedstock, most preferably a methanol- and ethanol-containing feedstock, is converted in the presence of a molecular sieve catalyst composition into one or more olefins, preferably and predominantly, ethylene and/or propylene, referred to herein as light olefins.

The feedstock, in one embodiment, contains one or more diluents, typically used to reduce the concentration of the feedstock. The diluents are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred. In other embodiments, the feedstock does not contain any diluent.

The diluent may be used either in a liquid or a vapor form, or a combination thereof. The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In one embodiment, other hydrocarbons are added to a feedstock either directly or indirectly, and include olefin(s), paraffin(s), aromatic(s) (see for example U.S. Pat. No. 4,677, 242, addition of aromatics) or mixtures thereof, preferably propylene, butylene, pentylene, and other hydrocarbons having 4 or more carbon atoms, or mixtures thereof.

The process for converting a feedstock, especially a feedstock containing one or more oxygenates, in the presence of a molecular sieve catalyst composition of the invention, is carried out in a reaction process in a reactor, where the process is a fixed bed process, a fluidized bed process (includes a turbulent bed process), preferably a continuous fluidized bed process, and most preferably a continuous high velocity fluidized bed process.

The reaction processes can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. Nos. 4,076,796, 6,287,522 (dual riser), and Fluidization Engineering, D. Kunii and 0. Levenspiel, Robert E. Krieger Publishing Company, New York, N.Y. 1977, which are all herein fully incorporated by reference.

The preferred reactor type are riser reactors generally described in Riser Reactor, Fluidization and Fluid-Particle Systems, pages 48 to 59, F. A. Zenz and D. F. Othmer, Reinhold Publishing Corporation, New York, 1960, and U.S. Pat. No. 6,166,282 (fast-fluidized bed reactor), and U.S. patent application Ser. No. 09/564,613 filed May 4, 2000 (multiple riser reactor), which are all herein fully incorporated by reference.

In an embodiment, the amount of liquid feedstock fed separately or jointly with a vapor feedstock, to a reactor system is in the range of from 0.1 weight percent to about 85 weight percent, preferably from about 1 weight percent to about 75 weight percent, more preferably from about 5 weight percent to about 65 weight percent based on the total weight of the feedstock including any diluent contained therein. The liquid and vapor feedstocks are preferably the same composition, or contain varying proportions of the same or different feedstock with the same or different diluent.

The conversion temperature employed in the conversion process, specifically within the reactor system, is in the range of from about 392° F. (200° C.) to about 1832° F. (1000° C.), preferably from about 482° F. (250° C.) to about 1472° F. (800° C.), more preferably from about 482° F. (250° C.) to about 1382° F. (750° C.), yet more preferably from about 572° F. (300° C.) to about 1202° F. (650° C.), yet even more preferably from about 662° F. (350° C.) to about 1112° F. (600° C.) most preferably from about 662° F. (350° C.) to about 1022° F. (550° C.).

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of from about 0.1 kPaa to about 5 MPaa, preferably from about 5 kPaa to about 1 MPaa, and most preferably from about 20 kPaa to about 500 kpaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidized state within a reactor.

Typically, the WHSV ranges from about 1 hr-1 to about 5000 hr-1, preferably from about 2 hr-1 to about 3000 hr-1, more preferably from about 5 hr-1 to about 1500 hr-1, and most preferably from about 10 hr-1 to about 1000 hr-1. In one preferred embodiment, the WHSV is greater than 20 hr-1, preferably the WHSV for conversion of a feedstock containing methanol, DME, or both, is in the range of from about 20 hr-1 to about 300 hr-1.

The superficial gas velocity (SGV) of the feedstock including diluent and reaction products within the reactor system is preferably sufficient to fluidize the molecular sieve catalyst composition within a reaction zone in the reactor. The SGV in the process, particularly within the reactor system, more particularly within the riser reactor(s), is at least 0.1 meter per second (m/sec), preferably greater than 0.5 m/sec, more preferably greater than 1 m/sec, even more preferably greater than 2 m/sec, yet even more preferably greater than 3 m/sec, and most preferably greater than 4 m/sec. See for example U.S. patent application Ser. No. 09/708,753 filed Nov. 8, 2000, which is herein incorporated by reference.

FIG. 1 shows an exemplary OTO reaction system. In the figure, an oxygenate such as methanol is directed through lines 100 to an OTO fluidized reactor 102 wherein the oxygenate is converted to light olefins and various by-products which are yielded from the fluidized reactor 102 in an olefin-containing stream in line 104. The olefin-containing stream in line 104 optionally comprises methane, ethylene, ethane, propylene, propane, various oxygenate byproducts, C4+ olefins, water and hydrocarbon components. The olefin-containing stream in line 104 is directed to a quench unit or quench tower 106 wherein the olefin-containing stream in line 104 is cooled and water and other readily condensable components are condensed.

The condensed components, which comprise water, are withdrawn from the quench tower 106 through a bottoms line 108. A portion of the condensed components are recycled through a line 110 back to the top of the quench tower 106. The components in line 110 preferably are cooled in a cooling unit, e.g., heat exchanger (not shown), so as to provide a cooling medium to cool the components in quench tower 106.

An olefin-containing vapor is yielded from the quench tower 106 through overhead stream 112. The olefin-containing vapor is compressed in one or more compressors 114 and the resulting compressed olefin-containing stream is optionally passed through line 116 to a water absorption unit 118. Methanol is preferably used as the water absorbent, and is fed to the top portion of the water absorption unit 118 through line 120. Methanol and entrained water, as well as some oxygenates, are separated as a bottoms stream through line 122. The light olefins are recovered through overhead line 124. Optionally, the light olefins are sent to an additional compressor or compressors (not shown), and then are input to a separation system 126, which optionally comprises one or more separation units such as distillation columns, absorption units, and/or adsorption units.

The separation system 126 separates the components contained in the overhead line 124. Thus, separation system 126 forms a light ends stream 127, optionally comprising methane, hydrogen and/or carbon monoxide; an ethylene-containing stream 128 comprising mostly ethylene; an ethane-containing stream 129 comprising mostly ethane; a propylene-containing stream 130 comprising mostly propylene; a propane-containing stream 131 comprising mostly propane; and one or more byproduct streams, shown as line 132, comprising one or more of the oxygenate byproducts, provided above, heavy olefins, heavy paraffins, and/or absorption mediums utilized in the separation process. Separation processes that may be utilized to form these streams are well-known and are described, for example, in pending U.S. patent application Ser. No. 10/124,859 filed Apr. 18, 2002; Ser. No.

10/125,138 filed Apr. 18, 2002; Ser. No. 10/383,204 filed Mar. 6, 2003; and Ser. No. 10/635,410 filed Aug. 6, 2003, the entireties of which are incorporated herein by reference.

FIG. 1 also illustrates a catalyst regeneration system, which is in fluid communication with fluidized reactor 102. As shown, at least a portion of the catalyst compositions contained in fluidized reactor 102 are withdrawn and transported, preferably in a fluidized manner, in conduit 133 from the fluidized reactor 102 to a catalyst stripper 134. In the catalyst stripper 134, the catalyst compositions contact a stripping medium, e.g., steam and/or nitrogen, under conditions effective to remove interstitial hydrocarbons from the molecular sieve catalyst compositions. As shown, stripping medium is introduced into catalyst stripper 134 through line 135, and the resulting stripped stream 136 is released from catalyst stripper 134. Optionally, all or a portion of stripped stream 136 is directed back to fluidized reactor 102.

During contacting of the oxygenate feedstock with the molecular sieve catalyst composition in the fluidized reactor 102, the molecular sieve catalyst composition may become at least partially deactivated. That is, the molecular sieve catalyst composition becomes at least partially coked. In order to reactivate the molecular sieve catalyst composition, the catalyst composition preferably is directed to a catalyst regenerator 138. As shown, the stripped catalyst composition is transported, preferably in the fluidized manner, from catalyst stripper 134 to catalyst regenerator 138 in conduit 137. Preferably, the stripped catalyst composition is transported in a fluidized manner through conduit 137.

In catalyst regenerator 138, the stripped catalyst composition contacts a regeneration medium, preferably comprising oxygen, under conditions effective (preferably including heating the coked catalyst) to at least partially regenerate the catalyst composition contained therein. As shown, the regeneration medium is introduced into the catalyst regenerator 138 through line 139, and the resulting regenerated catalyst compositions are ultimately transported, preferably in a fluidized manner, from catalyst regenerator 138 back to the fluidized reactor 102 through conduit 141. The gaseous combustion products are released from the catalyst regenerator 138 through flue gas stream 140. In another embodiment, not shown, the regenerated catalyst composition additionally or alternatively is directed, optionally in a fluidized manner, from the catalyst regenerator 138 to one or more of the fluidized reactor 102 and/or the catalyst stripper 134. In one embodiment, not shown, a portion of the catalyst composition in the reaction system is transported directly, e.g., without first passing through the catalyst stripper 134, optionally in a fluidized manner, from the fluidized reactor 102 to the catalyst regenerator 138.

As the catalyst compositions contact the regeneration medium in catalyst regenerator 138, the temperature of the catalyst composition may increase due to the exothermic nature of the regeneration process. As a result, it may be desirable to control the temperature of the catalyst composition by directing at least a portion of the catalyst composition from the catalyst regenerator 138 to a catalyst cooler 143. As shown, the catalyst composition is transported in a fluidized manner from catalyst regenerator 138 to the catalyst cooler 143 through conduit 142. The resulting cooled catalyst composition is transported, preferably in a fluidized manner from catalyst cooler 143 back to the catalyst regenerator 138 through conduit 144. In another embodiment, not shown, the cooled catalyst composition additionally or alternatively is directed, optionally in a fluidized manner, from the catalyst cooler 143 to one or more of the fluidized reactor 102 and/or the catalyst stripper 134.

C. Air Separation Units

As indicated above, the present invention is directed to integrating an air separation unit with an OTO reaction system. As used herein, an air separation unit (ASU) is an apparatus or combination of apparatuses which separates air into one or more of its components. Specifically, an ASU forms an oxygen stream, a nitrogen stream and optionally an argon stream. As used herein, "oxygen stream" means a stream comprising at least about 95 weight percent oxygen, based on the total weight of the oxygen stream. A "nitrogen stream" is a stream comprising at least about 95 weight percent nitrogen, based on the total weight of the nitrogen stream. An "argon stream" is a stream comprising at least about 95 weight percent argon, based on the total weight of the argon stream. Also, the ASU preferably has the ability to form one or more compressed air streams.

Additionally, the oxygen stream, the nitrogen stream, the optional argon stream, and the one or more compressed air streams preferably are substantially dry. Preferably, one or more of the oxygen stream, nitrogen stream, argon stream and the compressed air stream(s) have a dew point of less than about −90° F. (−68° C.).

Figure 2:
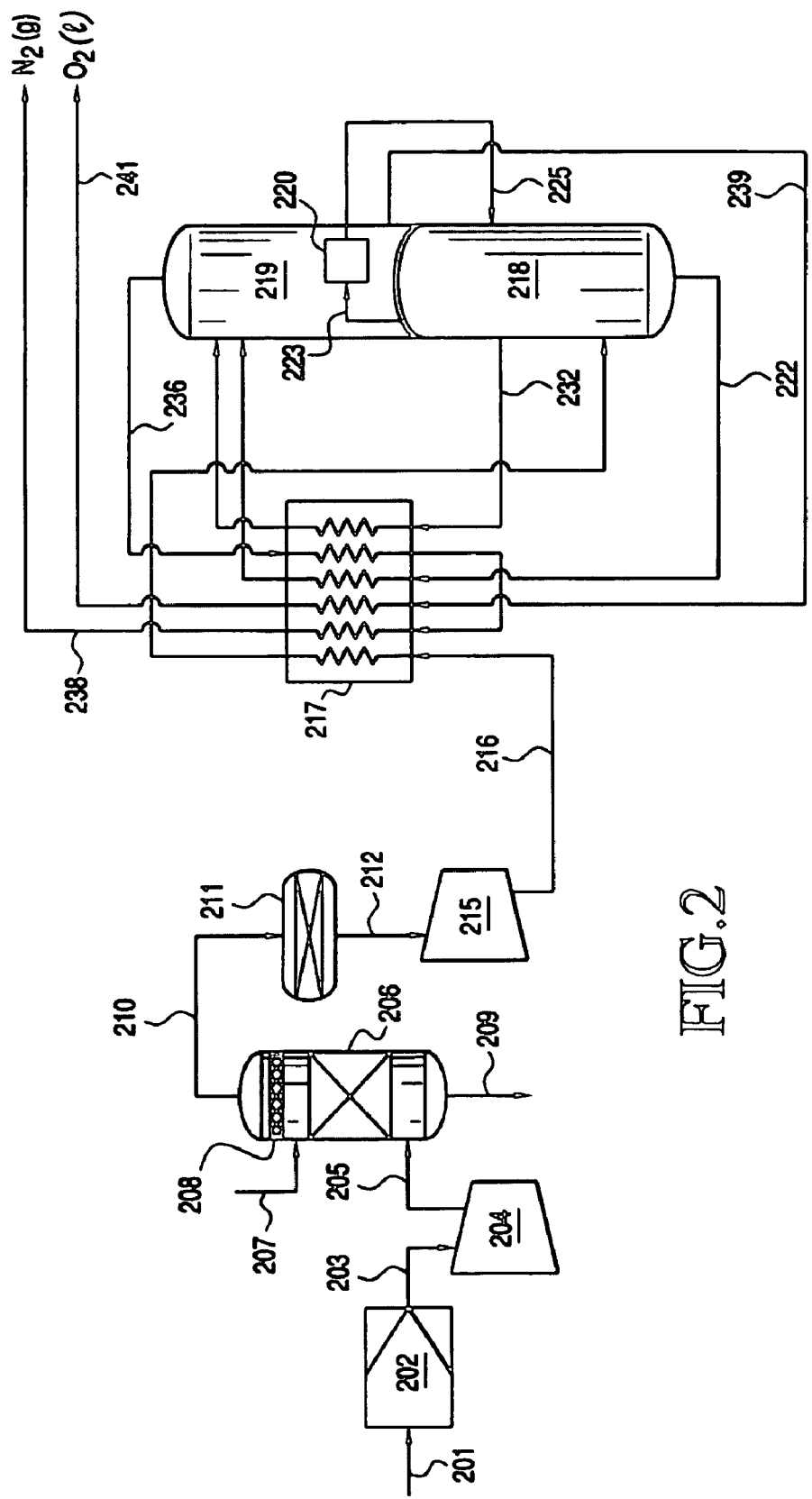
FIG. 2 presents a flow diagram illustrating an air separation unit.

A general description of one exemplary ASU is discussed below with reference to FIG. 2. As shown, air stream 201 is filtered in air filter 202 to form a filtered air stream 203. Air filter 202 may be selected from a variety of different types of filters optionally comprising activated carbon, paper, cotton, fiberglass, cellulose, polyester fiber, wire mesh, cut sheet metal. Filtered air stream 203 is directed to main air compressor 204. Main air compressor 204 optionally comprises one or more, preferably a plurality of, centrifugal compressors. For example, main air compressor 204 preferably comprises 4-5 stages. Although it is not required, main air compressor 204 optionally comprises a plurality of centrifugal compressors arranged as an integrated gear compressor or as axial compressors.

Main air compressor 204 compresses filtered air stream 203 to form first compressed air stream 205. Preferably, first compressed air steam 205 has a discharge pressure of from about 50 psia (345 kpaa) to about 350 psia (2,413 kpaa), preferably from about 150 psia (1,034 kPaa) to about 300 psia (2,068 kpaa).

First compressed air stream 205 is then directed to an air wash unit 206 wherein first compressed air stream 205 contacts a washing medium, introduced through line 207, under conditions effective to chill the air and remove water soluble air pollutants from first compressed air stream 205. As shown, wash medium 207 contacts first compressed air stream 205 in a counter current manner. Wash medium 207 thus exits air wash unit 206 through stream 209. Preferably, air wash unit 206 comprises a demister pad 208, which is adapted to filter out dust, and entrained wash medium, and other residual particulate material. Washed air stream 210 is released from air wash unit 206, and may comprise a minor amount of residual wash medium. Any of a variety of different wash mediums may be implemented in air wash unit 206. Preferably, wash medium 207 comprises water. Thus, washed air stream 210 may comprise a minor amount of water. As a result, washed air stream 210 preferably is directed to a dryer 211. In dryer 211, washed air stream 210 preferably contacts molecular sieve particles that are adapted to selectively remove the water therefrom and form dry air stream 212.

At least a portion of dry air stream 212 is then directed to a booster air compressor 215. Booster air compressor 215 preferably comprises a plurality of compression stages. Most preferably, the booster air compressor 215 comprises from 4 to about 5 compression stages. Booster air compressor 215 preferably compresses dry air stream 212 to form second compressed air stream 216, which preferably has a pressure of from about 150 psia (1,034 kpaa) to about 500 psia (3,447 kpaa), preferably from about 350 (2,413 kpaa) to about 450 psia (3,103 kpaa), and most preferably from about 375 (2,586 kpaa) to about 425 psia (2,930 kpaa).

Second compressed air stream 216 is then directed to heat exchanger 217, in which second compressed air stream 216 is cooled to cryogenic conditions. The resulting cooled second compressed air stream 216 is then fed into a high pressure separation unit 218, which preferably comprises one or more high pressure distillation columns.

In high pressure separation unit 218, cooled second compressed air stream 216 is subjected to conditions effective to form first overhead stream 223, side draw stream 232 and first bottoms stream 222. Ideally, first overhead stream 223 and side draw stream 232 are rich in nitrogen and first bottoms stream 222 is rich in oxygen.

As shown, first bottoms stream 222 is then directed to heat exchanger 217 and is introduced into low pressure separation unit 219. Low pressure separation unit 219 preferably comprises one or more cryogenic distillation columns. Additionally, low pressure separation unit 219 also receives a portion of side draw stream 232, which also passes through heat exchanger 217 prior to entering low pressure separation unit 219. In low pressure separation unit 219, the first bottom stream 222 and side draw stream 232 are separated into a second overhead stream 236, which is rich in nitrogen, and a second bottoms stream 239, which is rich in oxygen.

Second overhead stream 236 from low pressure separation unit 219 is then introduced into heat exchanger 217, where second overhead stream 236 is heated to form nitrogen stream 238. Nitrogen stream 238 preferably comprises at least about 95 weight percent nitrogen, more preferably at least about 98 weight percent nitrogen, and most preferably about 99 weight percent nitrogen, based on the total weight of nitrogen stream 238.

Second bottoms stream 239 preferably is withdrawn from low pressure separation unit 219 and is heated in heat exchanger 217 to form liquid oxygen stream 241. Liquid oxygen stream 241 preferably comprises at least about 95 weight percent oxygen, more preferably at least about 98 weight percent oxygen, and most preferably at least about 99.5 weight percent oxygen, based on the total weight of liquid oxygen stream 241.

First overhead stream 223 from high pressure separation unit 218 preferably is directed to a condenser 220, wherein readily condensable components contained in first overhead stream 223 are condensed to form condensed stream 225. At least a portion of condensed stream 225 optionally is reintroduced into high pressure separation unit 218, as shown.

D. Methanol Synthesis Systems

As indicated above, several embodiments of the present invention are directed to integrating an OTO reaction system with a methanol synthesis system. The following section describes several exemplary methanol synthesis systems that may be incorporated in the present invention.

1. Examples of Methanol Synthesis Processes

There are numerous technologies available for producing methanol including fermentation or the reaction of synthesis gas (syngas) derived from a hydrocarbon feed stream, which may include natural gas, petroleum liquids, carbonaceous materials including coal, recycled plastics, municipal waste or any other organic material. Methanol is typically synthesized from the catalytic reaction of syngas in a methanol synthesis reactor in the presence of a heterogeneous catalyst. For example, in one synthesis process methanol is produced using a copper/zinc oxide catalyst in a water-cooled tubular methanol reactor. Syngas is defined as a gas comprising carbon monoxide (CO), preferably hydrogen ($H_2$) and optionally carbon dioxide ($CO_2$). Optionally, syngas may also include unreacted feedstocks such as methane ($CH_4$), ethane, propane, heavier hydrocarbons, or other compounds. Generally, the production of syngas involves a reforming reaction of natural gas, mostly methane, and an oxygen source into hydrogen, carbon monoxide and/or carbon dioxide. Syngas production processes are well known, and include conventional steam reforming, partial oxidation reforming, catalytic partial oxidation reforming, autothermal reforming, or a combination thereof.

Methanol compositions can be manufactured from a hydrocarbon feed stream derived from a variety of carbon sources. Examples of such sources include biomass, natural gas, C1-C5 hydrocarbons, naphtha, heavy petroleum oils, or coke (i.e., coal). Preferably, the hydrocarbon feed stream comprises methane in an amount of at least about 50% by volume, more preferably at least about 70% by volume, most preferably at least about 80% by volume. In one embodiment of this invention natural gas is the preferred hydrocarbon feed source.

One way of converting the carbon source to a methanol composition is to first convert the carbon source to syngas, and then convert the syngas to the methanol composition. Any conventional process can be used. In particular, any conventional carbon oxide conversion catalyst can be used to convert the syngas to the methanol composition. In one embodiment, the carbon oxide conversion catalyst is a nickel containing catalyst.

The hydrocarbon feed stream that is used in the conversion of hydrocarbon to syngas is optionally treated to remove impurities that can cause problems in further processing of the hydrocarbon feed stream. These impurities can poison many conventional propylene and ethylene forming catalysts. A majority of the impurities that may be present can be removed in any conventional manner. The hydrocarbon feed is preferably purified to remove sulfur compounds, nitrogen compounds, particulate matter, other condensables, and/or other potential catalyst poisons prior to being converted into syngas.

In one embodiment of the invention, the hydrocarbon feed stream is passed to a syngas plant. The syngas preferably has an appropriate molar ratio of hydrogen to carbon oxide (carbon monoxide and/or carbon dioxide), as described below. The syngas plant may employ any conventional means of producing syngas, including partial oxidation, catalytic partial oxidation, steam or $CO_2$ reforming, or a combination of these two chemistries.

Steam reforming generally comprises contacting a hydrocarbon with steam to form syngas. The process preferably includes the use of a catalyst.

Partial oxidation generally comprises contacting a hydrocarbon with oxygen or an oxygen-containing gas such as air to form syngas. Partial oxidation takes place with or without the use of a catalyst, although the use of a catalyst is preferred. In one embodiment, water (steam) is added with the feed in the partial oxidation process. Such an embodiment is generally referred to as autothermal reforming.

Conventional syngas-generating processes include gas phase partial oxidation, autothermal reforming, fluid bed syngas generation, catalytic partial oxidation and various processes for steam reforming.

2. Steam Reforming to Make Syngas

In the catalytic steam reforming process, hydrocarbon feeds are converted to a mixture of $H_2$, CO and $CO_2$ by reacting hydrocarbons with steam over a catalyst. This process involves the following reactions:

$$CH_4 + H_2O \rightarrow CO + 3H_2 \qquad (I)$$

or $$C_nH_m + nH_2O \rightarrow nCO + [n+(m/2)]H_2 \qquad (II)$$

and $$CO + H_2O \rightarrow CO_2 + H_2 \text{(shift reaction)} \qquad (III)$$

As the steam reforming process does not require the addition of an oxygen reactant, this embodiment does not take advantage of the benefits of incorporating an ASU into the reaction system. As a result, this syngas generation process is less preferred than other syngas generation processes, such as partial oxidation reforming, which will take advantage of the ASU's ability to form a relatively pure oxygen source. Nevertheless, steam reforming may be utilized to form syngas according to the present invention.

The reaction is carried out in the presence of a catalyst. Any conventional reforming type catalyst can be used. The catalyst used in the step of catalytic steam reforming comprises at least one active metal or metal oxide of Group 6 or Group 8-10 of the Periodic Table of the Elements. The Periodic Table of the Elements referred to herein is that from CRC Handbook of Chemistry and Physics, 82nd Edition, 2001-2002, CRC Press LLC, which is incorporated herein by reference.

In one embodiment, the catalyst contains at least one Group 6 or Group 8-10 metal, or oxide thereof, having an atomic number of 28 or greater. Specific examples of reforming catalysts that can be used are nickel, nickel oxide, cobalt oxide, chromia and molybdenum oxide. Optionally, the catalyst is employed with at least one promoter. Examples of promoters include alkali and rare earth promoters. Generally, promoted nickel oxide catalysts are preferred.

The amount of Group 6 or Group 8-10 metals in the catalyst can vary. Preferably, the catalyst includes from about 3 wt % to about 40 wt % of at least one Group 6 or Group 8-10 metal, based on total weight of the catalyst. Preferably, the catalyst includes from about 5 wt % to about 25 wt % of at least one Group 6 or Group 8-10 metal, based on total weight of the catalyst.

The reforming catalyst optionally contains one or more metals to suppress carbon deposition during steam reforming. Such metals are selected from the metals of Group 14 and Group 15 of the Periodic Table of the Elements. Preferred Group 14 and Group 15 metals include germanium, tin, lead, arsenic, antimony, and bismuth. Such metals are preferably included in the catalyst in an amount of from about 0.1 wt % to about 30 wt %, based on total weight of nickel in the catalyst.

In a catalyst comprising nickel and/or cobalt there may also be present one or more platinum group metals, which are capable of increasing the activity of the nickel and/or cobalt and of decreasing the tendency to carbon lay-down when reacting steam with hydrocarbons higher than methane. The concentration of such platinum group metal is typically in the range 0.0005 to 0.1 weight percent metal, calculated as the whole catalyst unit. Further, the catalyst, especially in preferred forms, can contain a platinum group metal but no non-noble catalytic component. Such a catalyst is more suitable for the hydrocarbon steam reforming reaction than one containing a platinum group metal on a conventional support because a greater fraction of the active metal is accessible to the reacting gas. A typical content of platinum group metal when used alone is in the range 0.0005 to 0.5% w/w metal, calculated on the whole catalytic unit.

In one embodiment, the reformer unit includes tubes which are packed with solid catalyst granules. Preferably, the solid catalyst granules comprise nickel or other catalytic agents deposited on a suitable inert carrier material. More preferably, the catalyst is NiO supported on calcium aluminate, alumina, spinel type magnesium aluminum oxide or calcium aluminate titanate.

In yet another embodiment, both the hydrocarbon feed stream and the steam are preheated prior to entering the reformer. The hydrocarbon feedstock is preheated up to as high a temperature as is consistent with the avoiding of undesired pyrolysis or other heat deterioration. Since steam reforming is endothermic in nature, and since there are practical limits to the amount of heat that can be added by indirect heating in the reforming zones, preheating of the feed is desired to facilitate the attainment and maintenance of a suitable temperature within the reformer itself. Accordingly, it is desirable to preheat both the hydrocarbon feed and the steam to a temperature of at least 200° C.; preferably at least 400° C. The reforming reaction is generally carried out at a reformer temperature of from about 500° C. to about 1,200° C., preferably from about 800° C. to about 1,100° C., and more preferably from about 900° C. to about 1,050° C.

Gas hourly space velocity in the reformer should be sufficient for providing the desired CO to $CO_2$ balance in the syngas. Preferably, the gas hourly space velocity (based on wet feed) is from about 3,000 per hour to about 10,000 per hour, more preferably from about 4,000 per hour to about 9,000 per hour, and most preferably from about 5,000 per hour to about 8,000 per hour.

Any conventional reformer can be used in the step of catalytic steam reforming. The use of a tubular reformer is preferred. Preferably, the hydrocarbon feed is passed to a tubular reformer together with steam, and the hydrocarbon and steam contact a steam reforming catalyst. In one embodiment, the steam reforming catalyst is disposed in a plurality of furnace tubes that are maintained at an elevated temperature by radiant heat transfer and/or by contact with combustion gases. Fuel, such as a portion of the hydrocarbon feed, is burned in the reformer furnace to externally heat the reformer tubes therein. See, for example, Kirk-Othmer, Encyclopedia of Chemical Technology, 3rd Ed., 1990, vol. 12, p. 951; and Ullmann's Encyclopedia of Industrial Chemistry, 5th Ed., 1989, vol. A-12, p. 186, the relevant portions of each being fully incorporated herein by reference.

The ratio of steam to hydrocarbon feed will vary depending on the overall conditions in the reformer. The amount of steam employed is influenced by the requirement of avoiding carbon deposition on the catalyst, and by the acceptable methane content of the effluent at the reforming conditions maintained. On this basis, the mole ratio of steam to hydrocarbon feed in the conventional primary reformer unit is preferably from about 1.5:1 to about 5:1, preferably from about 2:1 to about 4:1.

Typically, the syngas formed comprises hydrogen and a carbon oxide. The hydrogen to carbon oxide ratio of the syngas produced will vary depending on the overall conditions of the reformer. Preferably, the molar ratio of hydrogen to carbon oxide in the syngas will range from about 1:1 to about 5:1. More preferably the molar ratio of hydrogen to carbon oxide will range from about 2:1 to about 3:1. Even more preferably the molar ratio of hydrogen to carbon oxide will range from about 2:1 to about 2.5:1. Most preferably the molar ration of hydrogen to carbon oxide will range from about 2:1 to about 2.3:1.

Steam reforming is generally carried out at superatmospheric pressure. The specific operating pressure employed is influenced by the pressure requirements of the subsequent process in which the reformed gas mixture is to be employed. Although any superatmospheric pressure can be used in practicing the invention, pressures of from about 175 psig (1,308 kPa abs.) to about 1,100 psig (7,686 kPa abs.) are desirable. Preferably, steam reforming is carried out at a pressure of from about 300 psig (2,170 kPa abs.) to about 800 psig (5,687 kPa abs.), more preferably from about 350 psig (2,515 kPa abs.) to about 700 psig (4,928 kPa abs.).

3. Partial Oxidation to Make Syngas

The invention optionally provides for the production of syngas, or CO and $H_2$, by oxidative conversion (also referred to herein as partial oxidation) of hydrocarbons, particularly natural gas and $C_1$-$C_5$ hydrocarbons. According to the process, one or more hydrocarbons are reacted with free-oxygen to form CO and $H_2$. The process is carried out with or without a catalyst. The use of a catalyst is preferred, preferably with the catalyst containing at least one non-transition or transition metal oxides. The process is essentially exothermic, and is an incomplete combustion reaction, having the following general formula:

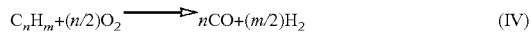

$$C_nH_m + (n/2)O_2 \longrightarrow nCO + (m/2)H_2 \quad (IV)$$

Non-catalytic partial oxidation of hydrocarbons to $H_2$, CO and $CO_2$ is desirably used for producing syngas from heavy fuel oils, primarily in locations where natural gas or lighter hydrocarbons, including naphtha, are unavailable or uneconomical compared to the use of fuel oil or crude oil. The non-catalytic partial oxidation process is carried out by injecting preheated hydrocarbon, oxygen and steam through a burner into a closed combustion chamber. Preferably, the individual components are introduced at a burner where they meet in a diffusion flame, producing oxidation products and heat. In the combustion chamber, partial oxidation of the hydrocarbons generally occurs with less than stoichiometric oxygen at very high temperatures and pressures. Preferably, the components are preheated and pressurized to reduce reaction time. The process preferably occurs at a temperature of from about 1,350° C. to about 1,600° C., and at a pressure of from above atmospheric to about 150 atm.

Catalytic partial oxidation comprises passing a gaseous hydrocarbon mixture, and oxygen, preferably in the form of compressed air or oxygen from an air separation unit, over reduced or unreduced composite catalysts. The reaction is optionally accompanied by the addition of water vapor (steam). When steam is added, the reaction is generally referred to as autothermal reduction. Autothermal reduction is both exothermic and endothermic as a result of adding both oxygen and water.

In the partial oxidation process, the catalyst comprises at least one transition element selected from the group consisting of Ni, Co, Pd, Ru, Rh, Ir, Pt, Os and Fe. Preferably, the catalyst comprises at least one transition element selected from the group consisting of Pd, Pt, and Rh. In another embodiment, preferably the catalyst comprises at least one transition element selected form the group consisting of Ru, Rh, and Ir.

In one embodiment, the partial oxidation catalyst further comprises at least one metal selected from the group consisting of Ti, Zr, Hf, Y, Th, U, Zn, Cd, B, Al, Tl, Si, Sn, Pb, P, Sb, Bi, Mg, Ca, Sr, Ba, Ga, V, and Sc. Also, optionally included in the partial oxidation catalyst is at least one rare earth element selected from the group consisting of La, Ce, Pr, Nd, Pm, Sm, Eu, Gd, Th, Dy, Ho, Er, Tm, Yb and Lu.

In another embodiment the catalyst employed in the process may comprise a wide range of catalytically active components, for example Pd, Pt, Rh, Ir, Os, Ru, Ni, Cr, Co, Ce, La and mixtures thereof. Materials not normally considered to be catalytically active may also be employed as catalysts, for example refractory oxides such as cordierite, mullite, mullite aluminum titanate, zirconia spinels and alumina.

In yet another embodiment, the catalyst is comprised of metals selected from those having atomic number 21 to 29, 40 to 47 and 72 to 79, the metals Sc, Ti V, Cr, Mn, Fe, Co, Ni, Cu, Zr, Nb, Mo, Tc, Ru, Rh, Pd, Ag, Hf, Ta, W, Re, Os Ir, Pt, and Au. The preferred metals are those in Group 8 of the Periodic Table of the Elements, that is Fe, Os, Co, Re, Ir, Pd, Pt, Ni, and Ru.

In another embodiment, the partial oxidation catalyst comprises at least one transition or non-transition metal deposited on a monolith support. The monolith supports are preferably impregnated with a noble metal such as Pt, Pd or Rh, or other transition metals such as Ni, Co, Cr and the like. Desirably, these monolith supports are prepared from solid refractory or ceramic materials such as alumina, zirconia, magnesia, ceria, silica, titania, mixtures thereof, and the like. Mixed refractory oxides, that is refractory oxides comprising at least two cations, may also be employed as carrier materials for the catalyst.

In one embodiment, the catalyst is retained in form of a fixed arrangement. The fixed arrangement generally comprises a fixed bed of catalyst particles. Alternatively, the fixed arrangement comprises the catalyst in the form of a monolith structure. The fixed arrangement may consist of a single monolith structure or, alternatively, may comprise a number of separate monolith structures combined to form the fixed arrangement. A preferred monolith structure comprises a ceramic foam. Suitable ceramic foams for use in the process are available commercially.

In yet another embodiment, the feed comprises methane, and the feed is injected with oxygen into the partial oxidation reformer at a methane to oxygen (i.e., $O_2$) ratio of from about 1.2:1 to about 10:1. Preferably the feed and oxygen are injected into the reformer at a methane to oxygen ratio of from about 1.6:1 to about 8:1, more preferably from about 1.8:1 to about 4:1.

Water may or may not be added to the partial oxidation process. When added, the concentration of water injected into the reformer is not generally greater than about 65 mole %, based on total hydrocarbon and water feed content. Preferably, when water is added, it is added at a water to methane ratio of not greater than 3:1, preferably not greater than 2:1.

The catalyst may or may not be reduced before the catalytic reaction. In one embodiment, the catalyst is reduced and reduction is carried out by passing a gaseous mixture comprising hydrogen and inert gas (e.g., $N_2$, He, or Ar) over the catalyst in a fixed bed reactor at a catalyst reduction pressure of from about 1 atm to about 5 atm, and a catalyst reduction temperature of from about 300° C. to about 700° C. Hydrogen gas is used as a reduction gas, preferably at a concentration of from about 1 mole % to about 100 mole %, based on total amount of reduction gas. Desirably, the reduction is further carried out at a space velocity of reducing gas mixture of from about 103 cm$^3$/g·hr to about 105 cm$^3$/g·hr for a period of from about 0.5 hour to about 20 hours.

In one embodiment, the partial oxidation catalyst is not reduced by hydrogen. When the catalyst is not reduced by hydrogen before the catalytic reaction, the reduction of the catalyst can be effected by passing the hydrocarbon feed and oxygen (or air) over the catalyst at temperature in the range of from about 500° C. to about 900° C. for a period of from about 0.1 hour to about 10 hours.

In the partial oxidation process, carbon monoxide (CO) and hydrogen ($H_2$) are formed as major products, and water and carbon dioxide ($CO_2$) as minor products. The gaseous product stream comprises the above mentioned products, unconverted reactants (i.e. methane or natural gas and oxygen) and components of feed other than reactants.

When water is added in the feed, the $H_2$:CO mole ratio in the product is increased by the shift reaction: $CO+H_2O \leftrightarrows H_2+CO_2$. This reaction occurs simultaneously with the oxidative conversion of the hydrocarbon in the feed to CO and $H_2$ or syngas. The hydrocarbon used as feed in the partial oxidation process is preferably in the gaseous phase when contacting the catalyst. The partial oxidation process is particularly suitable for the partial oxidation of methane, natural gas, associated gas or other sources of light hydrocarbons. In this respect, the term "light hydrocarbons" is a reference to hydrocarbons having from 1 to 5 carbon atoms. The process may be advantageously applied in the conversion of gas from naturally occurring reserves of methane which contain substantial amounts of carbon dioxide. In one embodiment, the hydrocarbon feed preferably contains from about 10 mole % to about 90 mole % methane, based on total feed content. More preferably, the hydrocarbon feed contains from about 20 mole % to about 80 mole % methane, based on total feed content. In another embodiment, the feed comprises methane in an amount of at least 50% by volume, more preferably at least 70% by volume, and most preferably at least 80% by volume.

In one embodiment of the invention, the hydrocarbon feedstock is contacted with the catalyst in a mixture with an oxygen-containing gas. Air is suitable for use as the oxygen-containing gas. Substantially pure oxygen as the oxygen-containing gas is preferred on occasions where there is a need to avoid handling large amounts of inert gas such as nitrogen. The feed optionally comprises steam.

In another embodiment of the invention, the hydrocarbon feedstock and the oxygen-containing gas are preferably present in the feed in such amounts as to give an oxygen-to-carbon ratio in the range of from about 0.3:1 to about 0.8:1, more preferably, in the range of from about 0.45:1 to about 0.75:1. References herein to the oxygen-to-carbon ratio refer to the ratio of oxygen in the from of oxygen molecules ($O_2$) to carbon atoms present in the hydrocarbon feedstock. Preferably, the oxygen-to-carbon ratio is in the range of from about 0.45:1 to about 0.65:1, with oxygen-to-carbon ratios in the region of the stoichiometric ratio of 0.5:1, that is ratios in the range of from about 0.45:1 to about 0.65:1, being more preferred. When steam is present in the feed, the steam-to-carbon ratio is not greater than about 3.0:1, more preferably not greater than about 2.0:1. The hydrocarbon feedstock, the oxygen-containing gas and steam, if present, are preferably well mixed prior to being contacted with the catalyst.

The partial oxidation process is operable over a wide range of pressures. For applications on a commercial scale, elevated pressures, that is pressures significantly above atmospheric pressure, are preferred. In one embodiment, the partial oxidation process is operated at pressures of greater than atmospheric up to about 150 bars. Preferably, the partial oxidation process is operated at a pressure in the range of from about 2 bars to about 125 bars, more preferably from about 5 bars to about 100 bars.

The partial oxidation process is also operable over a wide range of temperatures. At commercial scale, the feed is preferably contacted with the catalyst at high temperatures. In one embodiment, the feed mixture is contacted with the catalyst at a temperature in excess of 600° C. Preferably, the feed mixture is contacted with the catalyst at a temperature in the range of from about 600° C. to about 1,700° C., more preferably from about 800° C. to about 1,600° C. The feed mixture is preferably preheated prior to contacting the catalyst.

The feed is provided during the operation of the process at a suitable space velocity to form a substantial amount of CO in the product. In one embodiment, gas space velocities (expressed in normal liters of gas per kilogram of catalyst per hour) are in the range of from about 20,000 Nl/kg/hr to about 100,000,000 Nl/kg/hr, more preferably in the range of from about 50,000 Nl/kg/hr to about 50,000,000 Nl/kg/hr, and most preferably in the range of from about 500,000 Nl/kg/hr to about 30,000,000 Nl/kg/hr.

4. Combination Syngas Processes

Combination reforming processes can also be incorporated into this invention. Examples of combination reforming processes include autothermal reforming and fixed bed syngas generation. These processes involve a combination of gas phase partial oxidation and steam reforming chemistry.

The autothermal reforming process preferably comprises two syngas generating processes, a primary oxidation process and a secondary steam reforming process. In one embodiment, a hydrocarbon feed stream is steam reformed in a tubular primary reformer by contacting the hydrocarbon and steam with a reforming catalyst to form a hydrogen and carbon monoxide containing primary reformed gas, the carbon monoxide content of which is further increased in the secondary reformer. In one embodiment, the secondary reformer includes a cylindrical refractory lined vessel with a gas mixer, preferably in the form of a burner in the inlet portion of the vessel and a bed of nickel catalyst in the lower portion. In a more preferred embodiment, the exit gas from the primary reformer is mixed with air and residual hydrocarbons, and the mixed gas partial oxidized to carbon monoxides.

In another embodiment incorporating the autothermal reforming process, partial oxidation is carried out as the primary oxidating process. Preferably, hydrocarbon feed, oxygen, and optionally steam, are heated and mixed at an outlet of a single large coaxial burner or injector which discharges into a gas phase partial oxidation zone. Oxygen is preferably supplied in an amount which is less than the amount required for complete combustion.

Upon reaction in the partial oxidation combustion zone, the gases flow from the primary reforming process into the secondary reforming process. In one embodiment, the gases are passed over a bed of steam reforming catalyst particles or a monolithic body, to complete steam reforming. Desirably, the entire hydrocarbon conversion is completed by a single reactor aided by internal combustion.

In an alternative embodiment of the invention, a fixed bed syngas generation process is used to form syngas. In the fixed bed syngas generation process, hydrocarbon feed and oxygen or an oxygen-containing gas are introduced separately into a fluid catalyst bed. Preferably, the catalyst is comprised of nickel and supported primarily on alpha alumina.

The fixed bed syngas generation process is carried out at conditions of elevated temperatures and pressures that favor the formation of hydrogen and carbon monoxide when, for example, methane is reacted with oxygen and steam. Preferably, temperatures are in excess of about 1,700° F. (927° C.), but not so high as to cause disintegration of the catalyst or the sticking of catalyst particles together. Preferably, temperatures range from about 1,750° F. (954° C.) to about 1,950° F. (1,066° C.), more preferably, from about 1,800° F. (982° C.) to about 1,850° F. (1,010° C.).

Pressure in the fixed bed syngas generation process may range from atmospheric to about 40 atmospheres. In one embodiment, pressures of from about 20 atmospheres to about 30 atmospheres are preferred, which allows subsequent processes to proceed without intermediate compression of product gases.

In one embodiment of the invention, methane, steam, and oxygen are introduced into a fluid bed by separately injecting the methane and oxygen into the bed. Alternatively, each stream is diluted with steam as it enters the bed. Preferably, methane and steam are mixed at a methane to steam molar ratio of from about 1:1 to about 3:1, and more preferably from about 1.5:1 to about 2.5:1, and the methane and steam mixture is injected into the bed. Preferably, the molar ratio of oxygen to methane is from about 0.2:1 to about 1.0:1, more preferably from about 0.4:1 to about 0.6:1.

In another embodiment of the invention, the fluid bed process is used with a nickel based catalyst supported on alpha alumina. In another embodiment, silica is included in the support. The support is preferably comprised of at least 95 wt % alpha alumina, more preferably at least about 98% alpha alumina, based on total weight of the support.

In one embodiment, a gaseous mixture of hydrocarbon feedstock and oxygen-containing gas are contacted with a reforming catalyst under adiabatic conditions. For the purposes of this invention, the term "adiabatic" refers to reaction conditions in which substantially all heat loss and radiation from the reaction zone are prevented, with the exception of heat leaving in the gaseous effluent stream of the reactor.

5. Converting Syngas to Methanol

The syngas is sent to a methanol synthesis process and converted to methanol. The methanol synthesis process is accomplished in the presence of a methanol synthesis catalyst.

In one embodiment, the syngas is sent as is to the methanol synthesis process. In another embodiment, the hydrogen, carbon monoxide, and/or carbon dioxide content of the syngas is adjusted for efficiency of conversion. Desirably, the syngas input to the methanol synthesis reactor has a molar ratio of hydrogen ($H_2$) to carbon oxides ($CO+CO_2$) in the range of from about 0.5:1 to about 20:1, preferably in the range of from about 2:1 to about 10:1. In another embodiment, the syngas has a molar ratio of hydrogen ($H_2$) to carbon monoxide (CO) of at least 2:1. Carbon dioxide is optionally present in an amount of not greater than 50% by weight, based on total weight of the syngas.

Desirably, the stoichiometric molar ratio is sufficiently high so as maintain a high yield of methanol, but not so high as to reduce the volume productivity of methanol. Preferably, the syngas fed to the methanol synthesis has a stoichiometric molar ratio (i.e., a molar ratio of $H_2:(2CO+3CO_2)$) of from about 1.0:1 to about 2.7:1, more preferably from about 1.1 to about 2.0, more preferably a stoichiometric molar ratio of from about 1.2:1 to about 1.8:1.

The $CO_2$ content, relative to that of CO, in the syngas should be high enough so as to maintain an appropriately high reaction temperature and to minimize the amount of undesirable by-products such as paraffins. At the same time, the relative $CO_2$ to CO content should not be too high so as to reduce methanol yield. Desirably, the syngas contains $CO_2$ and CO at a molar ratio of from about 0.5 to about 1.2, preferably from about 0.6 to about 1.0.

In one embodiment, the catalyst used in the methanol synthesis process includes an oxide of at least one element selected from the group consisting of copper, silver, zinc, boron, magnesium, aluminum, vanadium, chromium, manganese, gallium, palladium, osmium and zirconium. Preferably, the catalyst is a copper based catalyst, more preferably in the form of copper oxide.

In another embodiment, the catalyst used in the methanol synthesis process is a copper based catalyst, which includes an oxide of at least one element selected from the group consisting of silver, zinc, boron, magnesium, aluminum, vanadium, chromium, manganese, gallium, palladium, osmium and zirconium. Preferably, the catalyst contains copper oxide and an oxide of at least one element selected from the group consisting of zinc, magnesium, aluminum, chromium, and zirconium. In one embodiment, the methanol synthesis catalyst is selected from the group consisting of: copper oxides, zinc oxides and aluminum oxides. More preferably, the catalyst contains oxides of copper and zinc.

In yet another embodiment, the methanol synthesis catalyst comprises copper oxide, zinc oxide, and at least one other oxide. Preferably, the at least one other oxide is selected from the group consisting of zirconium oxide, chromium oxide, vanadium oxide, magnesium oxide, aluminum oxide, titanium oxide, hafnium oxide, molybdenum oxide, tungsten oxide, and manganese oxide.

In various embodiments, the methanol synthesis catalyst comprises from about 10 wt % to about 70 wt % copper oxide, based on total weight of the catalyst. Preferably, the methanol synthesis contains from about 15 wt % to about 68 wt % copper oxide, and more preferably from about 20 wt % to about 65 wt % copper oxide, based on total weight of the catalyst.

In one embodiment, the methanol synthesis catalyst comprises from about 3 wt % to about 30 wt % zinc oxide, based on total weight of the catalyst. Preferably, the methanol synthesis catalyst comprises from about 4 wt % to about 27 wt % zinc oxide, more preferably from about 5 wt % to about 24 wt % zinc oxide.

In embodiments in which copper oxide and zinc oxide are both present in the methanol synthesis catalyst, the ratio of copper oxide to zinc oxide can vary over a wide range. Preferably in such embodiments, the methanol synthesis catalyst comprises copper oxide and zinc oxide in a Cu:Zn atomic ratio of from about 0.5:1 to about 20:1, preferably from about 0.7:1 to about 15:1, more preferably from about 0.8:1 to about 5:1.

The methanol synthesis catalyst is made according to conventional processes. Examples of such processes can be found in U.S. Pat. Nos. 6,114,279; 6,054,497; 5,767,039; 5,045,520; 5,254,520; 5,610,202; 4,666,945; 4,455,394; 4,565,803; 5,385,949, with the descriptions of each being fully incorporated herein by reference.

In one embodiment, the syngas formed in the syngas conversion plant is cooled prior to being sent to the methanol synthesis reactor. Preferably, the syngas is cooled so as to condense at least a portion of the water vapor formed during the syngas process.

The methanol synthesis process implemented in the present invention can be any conventional methanol synthesis process. Examples of such processes include batch processes and continuous processes. Continuous processes are preferred. Tubular bed processes and fluidized bed processes are particularly preferred types of continuous processes.

In general, the methanol synthesis process takes place according to the following reactions:

The methanol synthesis process is effective over a wide range of temperatures. In one embodiment, the syngas is contacted with the methanol synthesis catalyst at a temperature in the range of from about 302° F. (150° C.) to about 842° F. (450° C.), preferably in a range of from about 347° F. (175° C.) to about 662° F. (350° C.), more preferably in a range of from about 392° F. (200° C.) to about 572° F. (300° C.).

The process is also operable over a wide range of pressures. In one embodiment, the syngas is contacted with the methanol synthesis catalyst at a pressure in the range of from about 15 atmospheres to about 125 atmospheres, preferably in a range of from about 20 atmospheres to about 100 atmospheres, more preferably in a range of from about 25 atmospheres to about 75 atmospheres.

Gas hourly space velocities vary depending upon the type of continuous process that is used. Desirably, gas hourly space velocity of flow of gas through the catalyst bed is in the range of from about 50 hr-1 to about 50,000hr-1. Preferably, gas hourly space velocity of flow of gas through the catalyst bed is in the range of from about 250 hr-1 to about 25,000 hr-1, more preferably from about 500 hr-1 to about 10,000 hr-1.

The methanol synthesis process produces a variety of hydrocarbons as by-products. According to the methanol composition of this invention, it is desirable to operate the process so as to maximize not only the amount of methanol formed, but also aldehydes and other alcohols which are particularly desirable in the conversion of oxygenates to olefins. In is particularly appropriate to maximize the amount of methanol formed in the methanol synthesis, and remove hydrocarbons less desirable in the conversion of oxygenates to olefins from the crude methanol product stream formed in the methanol synthesis reactor.

6. Refining Crude Methanol to Make Methanol Product

In conventional methanol synthesis systems, the crude methanol product mixture formed in the methanol synthesis unit is further processed after reaction to obtain a desirable methanol-containing composition. Processing is accomplished by any conventional means. Examples of such means include distillation, selective condensation, and selective adsorption. Process conditions, e.g., temperatures and pressures, can vary according to the particular methanol composition desired. It is particularly desirable to minimize the amount of water and light boiling point components in the methanol-containing composition, but without substantially reducing the amount of methanol and desirable aldehydes and/or other desirable alcohols also present.

In one processing system, the crude methanol product from the methanol synthesis reactor is sent to a let down vessel so as to reduce the pressure to about atmospheric or slightly higher. This let down in pressure allows undesirable light boiling point components to be removed from the methanol composition as a vapor. The vapor is desirably of sufficient quality to use a fuel.

In another processing system, the crude methanol is sent from the methanol synthesizing unit to a distillation system. The distillation system contains one or more distillation columns which are used to separate the desired methanol composition from water and hydrocarbon by-products. Desirably, the methanol composition that is separated from the crude methanol comprises a majority of the methanol and a majority of aldehyde and/or alcohol supplements contained in the crude alcohol prior to separation. Preferably, the methanol composition that is separated from the crude methanol comprises a majority of the acetaldehyde and/or ethanol, if any, contained in the crude methanol prior to separation.

The distillation system optionally includes a step of treating the methanol steam being distilled so as to remove or neutralize acids in the stream. Preferably, a base is added in the system that is effective in neutralizing organic acids that are found in the methanol stream. Conventional base compounds can be used. Examples of base compounds include alkali metal hydroxide or carbonate compounds, and amine or ammonium hydroxide compounds. In one particular embodiment, about 20 ppm to about 120 ppm w/w of a base composition, calculated as stoichiometrically equivalent NaOH, is added, preferably about 25 ppm to about 100 ppm w/w of a base composition, calculated as stoichiometrically equivalent NaOH, is added.

The invention can include any distillation system that produces a "fusel oil" stream, which includes C1-C4 alcohols, aldehydes, ketones, esters and water. The fusel oil stream has a boiling point higher than that of methanol. It is especially advantageous when the fusel oil stream is liquid taken from a column fed with the crude methanol from the let-down vessel or with the bottoms liquid from a column fed with such crude methanol, the off-take point being at a level below the feed level. Alternatively or additionally, the fusel oil stream is taken from a level above the feed level in such a column. Because some of the higher alcohols are advantageous in the methanol composition of this invention, it is desirable to operate the distillation system to recover the $C_2$-$C_4$ alcohols along with the methanol rather than in the fusel oil stream.

Examples of distillation systems include the use of single and two column distillation columns. Preferably, the single columns operate to remove volatiles in the overhead, methanol product at a high level, fusel oil as vapor above the feed and/or as liquid below the feed, and water as a bottoms stream.

In one embodiment of a two column system, the first column is a "topping column" from which volatiles or "light ends" are taken overhead and methanol liquid as bottoms. A non-limiting list of possible light ends includes hydrogen, carbon monoxide and methane. The second is a "refining column" from which methanol product is taken as an overhead stream or at a high level, and water is removed as a bottoms stream. In this embodiment, the refining column includes at least one off-take for fusel oil as vapor above the feed and/or as liquid below the feed.

In another embodiment of a two column system, the first column is a water-extractive column in which there is a water feed introduced at a level above the crude methanol feed level. It is desirable to feed sufficient water to produce a bottoms liquid containing over 40% w/w water, preferably 40% to 60% w/w water, and more preferably 80% to 95% w/w water. This column optionally includes one or more direct fusel oil side off-takes.

In yet another embodiment, the distillation system is one in which an aqueous, semi-crude methanol is taken as liquid above the feed in a single or refining column. The semi-crude methanol is passed to a refining column, from which methanol product is taken overhead or at a high level. Preferably, water or aqueous methanol is taken as a bottoms stream.

Alternatively, undesirable by-products are removed from the crude methanol stream from the methanol synthesis reactor by adsorption. In such a system, fusel oil can be recovered by regenerating the adsorbent.

Figure 4:
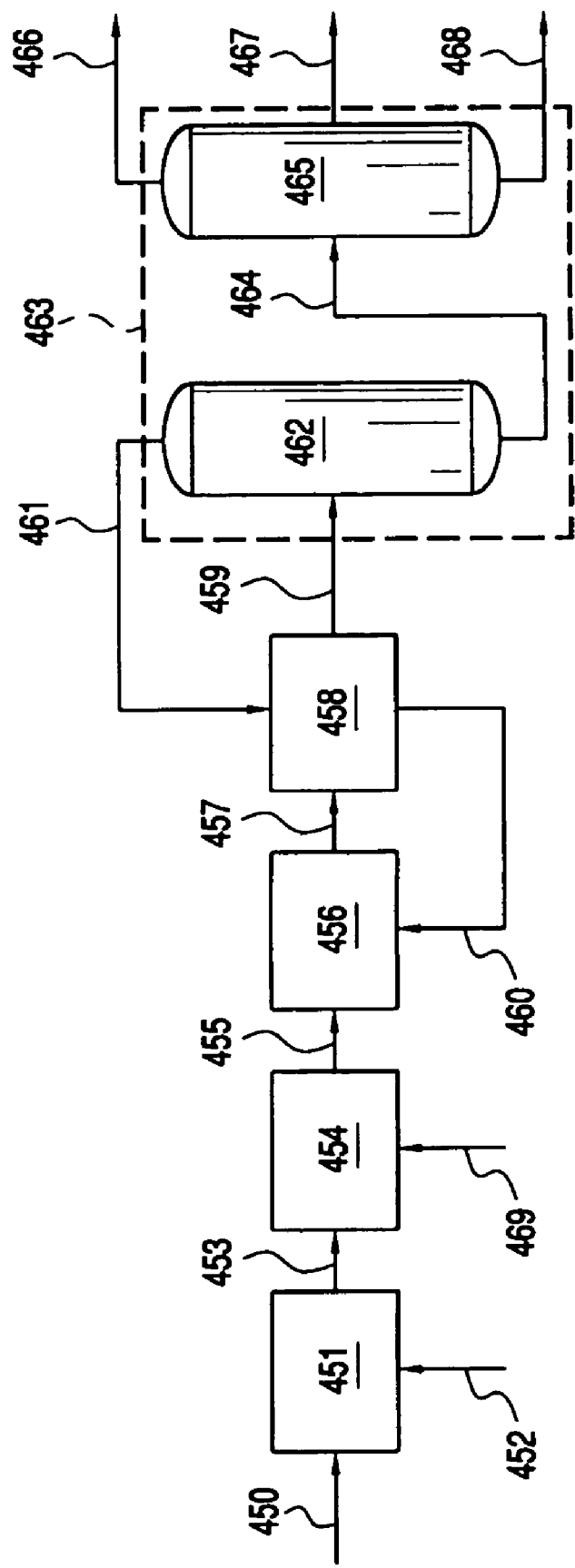
FIG. 4 presents a flow diagram illustrating a methanol synthesis system.

An exemplary methanol synthesis system is illustrated in FIG. 4 and will now be described in greater detail. As shown in FIG. 4, a feed stream 450, which preferably includes natural gas, is directed to a desulfurization unit 451. Prior to entering the desulfurization unit 451, the feed stream 450 optionally is compressed by one or more compressors, not shown, to facilitate movement of the feed stream 450 and various intermediate streams through the methanol synthesis system. In one embodiment, the natural gas from feed stream 450 contacts water from water stream 452 in the desulfurization unit 451 in a countercurrent manner under conditions effective to remove sulfur-containing components, e.g., $H_2S$ and/or mercaptans, therefrom. In this manner, the desulfurization unit 451 acts as an absorption unit. Additionally or alternatively, the desulfurization unit 451 may act as an adsorption unit. In this embodiment, the desulfurization unit 451 preferably includes one or more columns that are packed with molecular sieve particles, e.g., 3-5 angstrom molecular sieve particles, the pores of which are adapted to selectively capture the sulfur-containing components from natural gas stream 450. The optional adsorption unit optionally includes a regeneration system, not shown, for regenerating deactivated or partially deactivated molecular sieve particles. If the desulfurization unit 451 includes an adsorption unit, the feed stream 450 preferably is heated to a temperature of between 700° F. (371° C.) and 800° F. (427° C.) by a heat exchanger, not shown, before it is directed to desulfurization unit 451. The desulfurization unit 451 forms desulfurized feed stream 453, which is directed to a reforming unit 454. Preferably, desulfurized feed stream 453 comprises less than 5 weight percent, more preferably less than 1 weight percent, and most preferably less than 0.01 weight percent sulfur-containing compounds, based on the total weight of the desulfurized feed stream 453.

The reforming unit 454 converts the natural gas in desulfurized feed stream 453 to syngas in syngas stream 455. Generally, the production of syngas involves a combustion reaction of natural gas, mostly methane, and an oxygen source, e.g., air, into hydrogen, carbon monoxide and/or carbon dioxide. As shown, the oxygen source is introduced into reforming unit 454 through line 469. Syngas production processes are well known, and include conventional steam reforming, partial oxidation reforming, catalytic partial oxidation reforming, autothermal reforming, or a combination thereof. Thus, reforming unit 454 may be a steam reforming unit, a partial oxidation unit, a catalytic partial oxidation unit, an autothermal reforming unit, and/or a combined reforming unit, e.g., a unit that combines two or more of these reforming processes. In one embodiment, water from water stream 452 preferably increases the water content of, and more preferably saturates, the feed stream 450, in the process of removing sulfur-containing components. Additionally or alternatively, the desulfurized feed stream 453 is directed to a separate saturation unit, not shown, in which water contacts the desulfurized feed stream 453 under conditions effective to saturate the desulfurized feed stream 453 or increase the water content thereof. For example, the saturation unit may include a packed or tray column wherein water contacts the desulfurized feed stream 453 in a countercurrent manner under conditions effective to saturate or increase the water content of the desulfurized feed stream 453. Saturation of the feed stream 450 and/or desulfurized feed stream 453 is particularly beneficial if the reforming unit 454 implements a steam reforming process as a water-containing or saturated desulfurized feed stream 453 may be necessary in order for the steam reforming process to convert the desulfurized feed stream 453 to syngas in syngas stream 455. Additionally or alternatively, water may be injected directly into the reforming unit 454, particularly if the reforming unit 454 provides a steam reforming process. Resulting syngas stream 455 is directed to a compression zone 456, wherein the syngas stream 455 is compressed in one or more stages to form compressed stream 457. Preferably, the compression zone 456 includes one or more centrifugal compressors. Compressed stream 457 is then directed to a methanol synthesis unit 458, wherein the syngas in compressed stream 457 contacts a methanol synthesis catalyst under conditions effective to convert at least a portion of the syngas to crude methanol in crude methanol stream 459. Optionally, unreacted syngas from methanol synthesis unit 458 is recycled to compression zone 456 as shown by unreacted syngas stream 460.

The crude methanol in crude methanol stream 459 includes light ends, methanol, water, and fusel oil. Preferably, prior to introduction into separation zone 463, the crude methanol stream 459 is treated with a caustic medium, not shown, in a caustic wash unit, not shown, under conditions effective to increase the pH of the crude methanol stream 459. As a result, the crude methanol stream 459 also optionally includes dissolved caustic salts. As shown, crude methanol stream 459 is directed to a separation zone 463, which is adapted to separate one or more of these components and isolate a relatively pure methanol stream. The separation zone 463 includes a light ends separation unit 462, such as a topping column, and a refining column 465. Crude methanol stream 459 is first directed to the light ends separation unit 462, wherein conditions are effective to separate the crude methanol stream 459 into light ends stream 461 and bottoms crude methanol stream 464, which contains methanol, water, fusel oil, and optionally dissolved caustic salts. The light ends separation unit 462 typically includes from about 50 to about 80 trays and has a cross-sectional diameter of from about 8 feet (2.4 m) to about 20 feet (6 m). At least a portion of the light ends stream 461 preferably is recycled to methanol synthesis unit 458, as shown, for further conversion to methanol while the bottoms crude methanol stream 464 is directed to refining column 465 for further processing. In refining column 465, the bottoms crude methanol stream 464 is subjected to conditions effective to separate the bottoms crude methanol stream 464 into a refined methanol stream 466, a fusel oil stream 467, and a water stream 468. A majority of the caustic salts, if any, from bottoms crude methanol stream 464 are dissolved in water stream 468. Preferably, refined methanol stream 466 contains at least 95.0 weight percent, more preferably at least 99.0 weight percent and most preferably at least 99.5 weight percent methanol, based on the total weight of the refined methanol stream 466. Preferably, refined methanol stream 466 contains less than 0.25 weight percent, more preferably less than 1 weight percent and most preferably less than 5 weight percent water, based on the total weight of the refined methanol stream 466. The refining column 465 typically includes from about 80 to about 120 trays and has a cross-sectional diameter of from about 10 feet (3.0 m) to about 24 feet (7.2 m).

E. Integrated Reaction Processes

1. ASU-Derived Regeneration MEDIUMS

A preferred embodiment of the present invention is directed to a process for regenerating catalyst. In the process, an oxygenate such as methanol contacts a molecular sieve catalyst composition in a reactor under conditions effective to convert the methanol to light olefins and to form an at least partially coked molecular sieve catalyst composition. The at least partially coked molecular sieve catalyst composition is directed from the reactor to a catalyst regenerator. An oxygen-containing regeneration medium, which comprises one or more streams derived from an ASU, is directed from an air separation unit to the catalyst regenerator. In the catalyst regenerator, the regeneration medium contacts the at least partially coked molecular sieve catalyst composition under conditions effective to at least partially regenerate the at least partially coked molecular sieve catalyst composition and form a regenerated catalyst composition, which is directed from the catalyst regenerator to the reactor.

By utilizing an oxygen-rich regeneration medium, increased regeneration efficiency can be realized. As a result, the size of a catalyst regenerator that implements a high oxygen, low nitrogen content, regeneration medium may be smaller than conventional catalyst regenerators that utilize air as the regeneration medium. A commensurate decrease in catalyst attrition and loss of entrained catalyst can be realized due to this decrease in catalyst regenerator size. Also, as indicated above, ASU-derived streams are particularly dry advantageously reducing the hydrothermal deactivation of the regenerated catalyst compositions prior to reintroduction into the fluidized reactor.

An additional advantage to implementing one or more streams derived from an ASU as a regeneration medium is that the ASU-derived streams may be particularly cold having been derived from a cryogenic separation system, as discussed above with reference to FIG. 2. The introduction of a cold regeneration medium into a catalyst regenerator can help maintain the regenerator temperature in a desirable range. As a result, the workload of any catalyst coolers associated with the catalyst regeneration system may be advantageously reduced. In one embodiment, the ASU-derived regeneration medium is at a temperature of from about 40° F. (4° C.) to about 400° F. (204° C.), preferably from about 60° F. (16° C.) to about 300° F. (149° C.), and most preferably from about 80° F. (27° C.) to about 200° F. (93° C.) at a point immediately before the regeneration medium is introduced into the catalyst regenerator.

In this embodiment, the ASU preferably forms an oxygen stream, a nitrogen stream and a compressed air stream. The regeneration medium comprises oxygen from the oxygen stream and optionally at least a portion of the nitrogen in the nitrogen stream. Additionally or alternatively, the regeneration medium comprises at least a portion of the compressed air stream. Ideally, however, the oxygen-containing stream used as the regeneration medium has a high oxygen content and a low nitrogen content to allow for increased regeneration efficiency and smaller catalyst regenerators. Depending on the desired regeneration conditions, it may be desirable to blend one or more of the three streams from the ASU in different amounts in order to form the regeneration medium. In one embodiment, the oxygen-containing stream has an oxygen to nitrogen weight ratio of from about 0.05 to about 10, preferably from about 0.1 to about 1.0, more preferably from about 0.2 to about 0.5 wt/wt.

Preferably, the reactor comprises a reaction zone and a disengaging zone. In this embodiment, the conversion of the oxygenate to light olefins, as well as the coking of the molecular sieve catalyst composition implemented in the OTO conversion process, occurs substantially in the reaction zone although a minor amount of oxygenates may continue to convert to light olefins in the disengaging zone. After this conversion step, the at least partially coked molecular sieve catalyst composition and the light olefins are directed to the disengaging zone wherein the catalyst composition is separated from the light olefins, which are yielded from the disengaging zone in an olefin-containing effluent stream. Preferably, the catalyst composition contained in the disengaging zone is transferred back to the reaction zone through one or more standpipes, which are in fluid communication with the reaction zone and the disengaging zone.

Figure 3:
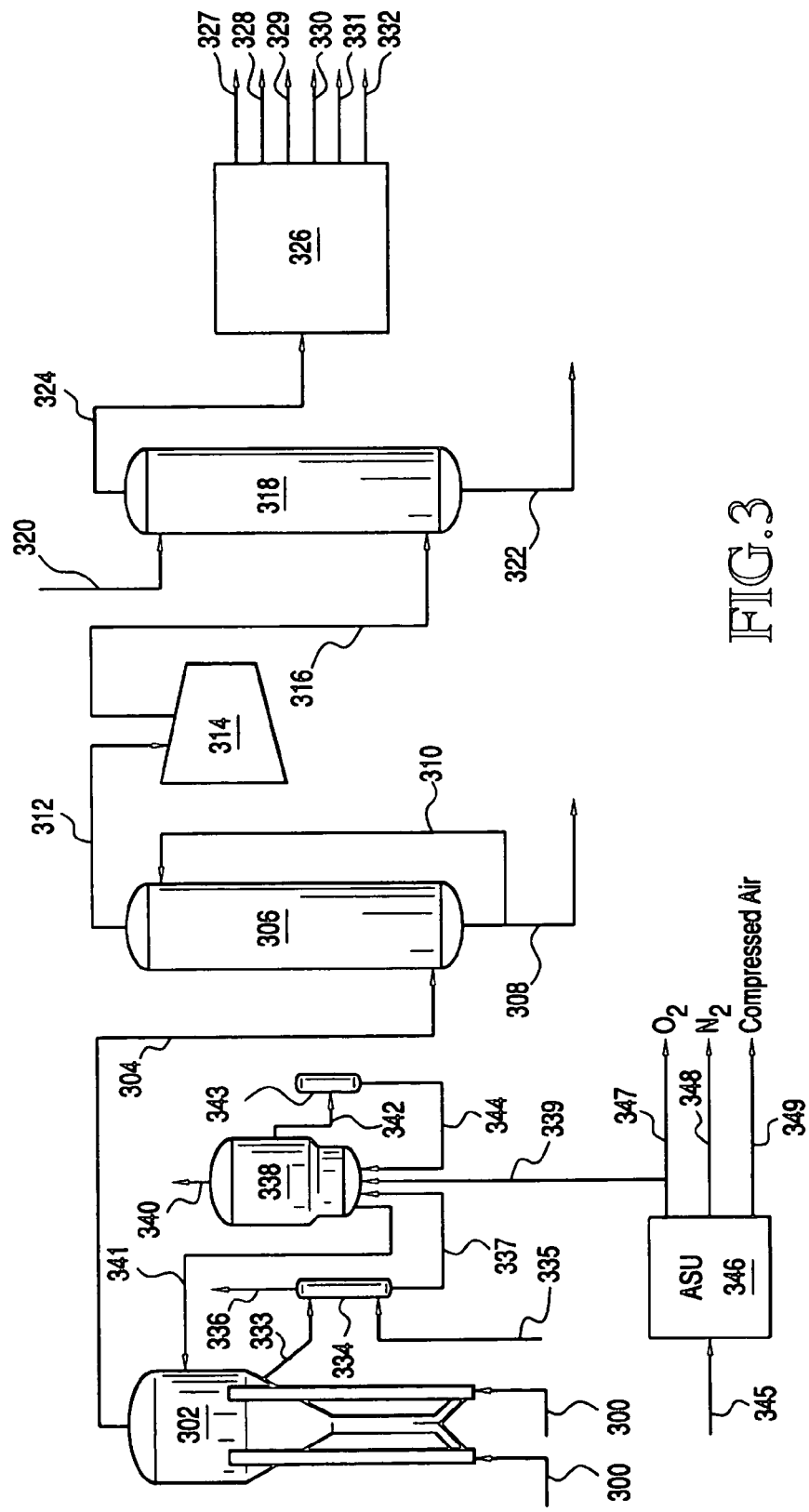
FIG. 3 presents a flow diagram illustrating an integrated oxygenate to olefin reaction system, which includes an integrated air separation unit according to one embodiment of the present invention.

FIG. 3 illustrates an OTO reaction system according to one embodiment of the present invention. In this embodiment, the OTO reaction system includes a catalyst regenerator 338 that receives a regeneration medium comprising an oxygen stream derived from an ASU 346. As shown, an oxygenate such as methanol is directed through lines 300 to an OTO fluidized reactor 302 wherein the oxygenate is converted to light olefins and various by-products which are yielded from the fluidized reactor 302 in an olefin-containing stream in line 304. The olefin-containing stream in line 304 optionally comprises methane, ethylene, ethane, propylene, propane, various oxygenate byproducts, C4+ olefins, water and hydrocarbon components. The olefin-containing stream in line 304 is directed to a quench unit or quench tower 306 wherein the olefin-containing stream in line 304 is cooled and water and other readily condensable components are condensed.

The condensed components, which comprise water, are withdrawn from the quench tower 306 through a bottoms line 308. A portion of the condensed components are recycled through a line 310 back to the top of the quench tower 306. The components in line 310 preferably are cooled in a cooling unit, e.g., heat exchanger (not shown), so as to provide a cooling medium to cool the components in quench tower 306.

An olefin-containing vapor is yielded from the quench tower 306 through overhead stream 312. The olefin-containing vapor is compressed in one or more compressors 314 and the resulting compressed olefin-containing stream is optionally passed through line 316 to a water absorption unit 318. Methanol is preferably used as the water absorbent, and is fed to the top portion of the water absorption unit 318 through line 320. Methanol and entrained water, as well as some oxygenates, are separated as a bottoms stream through line 322. The light olefins are recovered through overhead line 324. Optionally, the light olefins are sent to an additional compressor or compressors (not shown), and then are input to a separation system 326, which optionally comprises one or more separation units such as distillation columns, absorption units, and/or adsorption units.

The separation system 326 separates the components contained in the overhead line 324. Thus, separation system 326 forms a light ends stream 327, optionally comprising methane, hydrogen and/or carbon monoxide; an ethylene-containing stream 328 comprising mostly ethylene; an ethane-containing stream 329 comprising mostly ethane; a propylene-containing stream 330 comprising mostly propylene; a propane-containing stream 331 comprising mostly propane; and one or more byproduct streams, shown as line 332, comprising one or more of the oxygenate byproducts, provided above, heavy olefins, heavy paraffins, and/or absorption mediums utilized in the separation process.

FIG. 3 also illustrates a catalyst regeneration system, which is in fluid communication with fluidized reactor 302 and an air separation unit 346. As shown, at least a portion of the catalyst compositions contained in fluidized reactor 302 are withdrawn and transported, preferably in a fluidized manner, in conduit 333 from the fluidized reactor 302 to a catalyst stripper 334. In the catalyst stripper 334, the catalyst compositions contact a stripping medium, e.g., steam and/or nitrogen, under conditions effective to remove interstitial hydrocarbons from the molecular sieve catalyst compositions. As shown, stripping medium is introduced into catalyst stripper 334 through line 335, and the resulting stripped stream 336 is released from catalyst stripper 334. Optionally, all or a portion of stripped stream 336 is directed back to fluidized reactor 302.

During contacting of the oxygenate feedstock with the molecular sieve catalyst composition in the fluidized reactor 302, the molecular sieve catalyst composition may become at least partially deactivated. That is, the molecular sieve catalyst composition becomes at least partially coked. In order to reactivate the molecular sieve catalyst composition, the catalyst composition preferably is directed to a catalyst regenerator 338. As shown, the stripped catalyst composition is transported, preferably in the fluidized manner, from catalyst stripper 334 to catalyst regenerator 338 in conduit 337. Preferably, the stripped catalyst composition is transported in a fluidized manner through conduit 337.

In this embodiment of the present invention, the catalyst regenerator 338 is also in fluid communication with an ASU 346. As shown, ASU 346 receives an air stream 345. The ASU 346 processes air stream 345 as discussed above with reference to FIG. 2, for example, to form an oxygen stream 347, a nitrogen stream 348 and one or more compressed air streams 349. In a preferred embodiment of the present invention, at least a portion of the oxygen stream 347 is directed to the catalyst regenerator 338 to serve as the regeneration medium, as shown by line 339. Additionally or alternatively, at least a portion of the compressed air stream 349 and/or at least a portion of the nitrogen stream 348 is directed to the catalyst regenerator 338 in the regeneration medium.

In catalyst regenerator 338, the stripped catalyst composition contacts the regeneration medium under conditions effective (preferably including heating the coked catalyst) to at least partially regenerate the catalyst composition contained therein. As shown, the resulting regenerated catalyst compositions are ultimately transported, preferably in a fluidized manner, from catalyst regenerator 338 back to the fluidized reactor 302 through conduit 341. The gaseous combustion products are released from the catalyst regenerator 338 through flue gas stream 340. In another embodiment, not shown, the regenerated catalyst composition additionally or alternatively is directed, optionally in a fluidized manner, from the catalyst regenerator 338 to one or more of the fluidized reactor 302 and/or the catalyst stripper 334. In one embodiment, not shown, a portion of the catalyst composition in the reaction system is transported directly, e.g., without first passing through the catalyst stripper 334, optionally in a fluidized manner, from the fluidized reactor 302 to the catalyst regenerator 338.

As the catalyst compositions contact the regeneration medium in catalyst regenerator 338, the temperature of the catalyst composition may increase due to the exothermic nature of the regeneration process. As a result, it may be desirable to control the temperature of the catalyst composition by directing at least a portion of the catalyst composition from the catalyst regenerator 338 to a catalyst cooler 343. As shown, the catalyst composition is transported in a fluidized manner from catalyst regenerator 338 to the catalyst cooler 343 through conduit 342. The resulting cooled catalyst composition is transported, preferably in a fluidized manner from catalyst cooler 343 back to the catalyst regenerator 338 through conduit 344. In another embodiment, not shown, the cooled catalyst composition additionally or alternatively is directed, optionally in a fluidized manner, from the catalyst cooler 343 to one or more of the fluidized reactor 302 and/or the catalyst stripper 334.

In another embodiment, the oxygenate in the OTO conversion process comprises methanol, and the integrated OTO reaction system comprises a methanol synthesis system. In one methanol synthesis reaction, natural gas contacts oxygen in a syngas generator under conditions effective to convert the natural gas to syngas. The syngas contacts a methanol synthesis catalyst in a methanol synthesis unit under conditions effective to convert the natural gas to methanol. The natural gas optionally comprises water, which should be removed from the natural gas prior to introduction to the syngas generator. The water preferably is adsorbatively removed with a molecular sieve particle, which may be regenerated after water removal with one or more streams from the ASU, preferably the nitrogen stream. Thus, in this embodiment, the process includes a step of contacting at least a portion of the natural gas with a molecular sieve particle under conditions effective to adsorbatively remove the water therefrom and form a water-containing molecular sieve particle. The water-containing molecular sieve particle contacts at least a portion of the nitrogen stream from the ASU under conditions effective to regenerate the water-containing molecular sieve particle. The nitrogen stream from the ASU is particularly well-suited for use as the regeneration medium as it is substantially dry. Preferably, the mol sieve regeneration conditions comprise a regeneration temperature of from about 600° F. (316° C.) to about 900° F. (482° C.) and a pressure of from about 10 psig (69 kpag) to about 100 psig (690 kpag).

In one embodiment, the effluent stream formed in the OTO conversion process comprises light olefins and generally undesirable unsaturated compounds such as, but not limited to, one or more of acetylene, propadiene, methyl acetylene and/or butadiene. Thus, the effluent stream may comprise an unsaturated compound selected from the group consisting of acetylene, methyl acetylene and butadiene. Due to their tendency to polymerize, the unsaturated compounds preferably are selectively removed from the effluent stream. In one preferred embodiment of the present invention, the unsaturated compound contacts a metal activated catalyst and a hydrogenation medium under conditions effective to hydrogenate the unsaturated compound and to form an at least partially coked metal activated catalyst. Optionally, the metal activated catalyst comprises an alumina support with surface deposition of silver and palladium. The hydrogenation source preferably is derived from a hydrogen plant or from byproduct hydrogen from a chemical plant or refinery. The at least partially coked metal activated catalyst contacts a second regeneration medium under conditions effective to convert the at least partially coked metal activated catalyst to a regenerated metal activated catalyst. The second regeneration medium preferably comprises one or more streams from the ASU. Preferably, the second regeneration medium comprises at least a portion of the oxygen stream or at least a portion of the compressed air stream from the ASU.

In one embodiment, the effluent stream formed in the OTO conversion process comprises light olefins and undesirable polymerization catalyst poisons such as, but not limited to, one or more of alkynes, alkenes and oxygenated hydrocarbons. Thus, the effluent stream may comprise a polymerization catalyst poison selected from the group consisting of alkynes, alkenes and oxygenated hydrocarbons. The polymerization catalyst poisons preferably are selectively removed from the effluent stream prior to light olefin polymerization. In one preferred embodiment of the present invention, at least a portion of the effluent stream contacts a molecular sieve particle under conditions effective to adsorbatively remove the polymerization catalyst poison therefrom and to form a poison-containing molecular sieve particle. The poison-containing molecular sieve particle contacts at least a portion of the nitrogen stream from the ASU under conditions effective to regenerate the poison-containing molecular sieve particle.

2. ASU-Derived Fluidization Streams

In another embodiment of the present invention, one or more of the streams derived from the ASU, e.g., the oxygen stream, the nitrogen stream and/or the compressed air stream, are used as a fluidizing stream in the OTO reaction system. A "fluidizing stream" is a stream comprising one or more gaseous components, which stream is capable of causing a plurality of particles to behave in a fluidized manner. Catalyst fluidization in OTO reaction systems is thoroughly described in co-pending U.S. patent application Ser. No. 10/729,568, filed on Dec. 5, 2003, the entirety of which is incorporated herein by reference.

With continuing reference to FIG. 3, at least a portion of the nitrogen stream and/or at least a portion of the optional argon stream are directed from the ASU to one or more conduits in the OTO reaction system to serve as the fluidizing stream in these one or more conduits. For example, a portion of nitrogen stream 348 or the argon stream, not shown, may be directed to one or more of streams 333, 337, 342, 344, and/or 341, to fluidize the catalyst contained therein. A portion of the compressed air stream 349 and/or a portion of the oxygen stream 347 from the ASU may serve as the fluidizing medium in one or more of streams 333, 337, 342 or 344, as the oxygen contained in oxygen stream 347 and/or compressed air stream 349 will be substantially combusted in catalyst regenerator 338 rather than being undesirably introduced into the fluidized reactor 302. The regenerated catalyst in stream 341 preferably is not fluidized with the oxygen stream 347 or the compressed air stream 349 as it is undesirable to introduce oxygen into the fluidized reactor 302.

In one embodiment, for example, transport of the catalyst composition from the disengaging zone to the reaction zone of an OTO reactor through one or more standpipes is facilitated by contacting the catalyst composition with a fluidizing stream in the standpipe under conditions effective to transport the catalyst composition in a fluidized manner from the disengaging zone (or from the standpipe) to the reaction zone. In this embodiment, the fluidizing medium ideally comprises one or more of: at least a portion of the oxygen stream, at least a portion of the nitrogen stream and/or at least a portion of the compressed air stream from an ASU. Due to safety and catalyst deactivation issues, the fluidizing stream preferably has a low oxygen content and a high nitrogen content. Ideally, the fluidizing stream in this embodiment has an oxygen to nitrogen weight ratio of from about 0.05 to about 10, preferably from about 0.1 to about 1.0, more preferably from about 0.2 to about 0.5 wt/wt.

Similarly, transport of the at least partially coked molecular sieve catalyst composition from the reactor (e.g., from the reaction zone and/or from the disengaging zone) to the catalyst regenerator optionally is facilitated by contacting the at least partially coked molecular sieve catalyst composition with a fluidizing stream under conditions effective to transport the at least partially coked molecular sieve catalyst composition in a fluidized manner between these units. In this embodiment, the fluidizing stream preferably comprises at least a portion of the oxygen stream, at least a portion of the nitrogen stream or at least a portion of the compressed air stream from the ASU. The flow rate of the fluidizing stream will vary widely depending on conduit diameter and desired fluidization flow characteristics. It should be noted that the at least partially coked molecular sieve catalyst composition may be transported from the reactor to the catalyst regenerator through series of conduits and/or intermediate units, e.g., a catalyst stripper and/or catalyst cooler. In such embodiments, the at least partially coked molecular sieve catalyst composition preferably is transported in a fluidized manner in one, more than one, or all of the conduits that are in fluid communication between reactor and the catalyst regenerator. Ideally, the fluidizing stream in this embodiment has an oxygen to nitrogen weight ratio of from about 0.05 to about 10, preferably from about 0.1 to about 1.0, more preferably from about 0.2 to about 0.5 wt/wt.

Additionally or alternatively, the regenerated molecular sieve catalyst composition optionally contacts a fluidizing stream under conditions effective to transport the regenerated molecular sieve catalyst composition in a fluidized manner from the catalyst regenerator back to the reactor, optionally through a series of conduits and/or intermediate units. In this embodiment, the fluidizing stream preferably comprises at least a portion of the oxygen stream, at least a portion of the nitrogen stream or at least a portion of the compressed air stream from the ASU. In this embodiment, the fluidizing stream preferably has a low oxygen content and a high nitrogen content due to safety considerations of using a high oxygen content fluidizing stream in the OTO reactor. Additionally, a high oxygen content fluidizing stream may significantly deactivate the molecular sieve catalyst composition. Ideally, the fluidizing stream has an oxygen to nitrogen weight ratio of from about 0.05 to about 10, preferably from about 0.1 to about 1.0, more preferably from about 0.2 to about 0.5 wt/wt.

In another embodiment, at least a portion of the molecular sieve catalyst composition is transported in a fluidized manner from the reaction system to a catalyst storage unit, for example, in preparation for reaction system shut-down. The catalyst composition may be transported to the catalyst storage unit from any portion of the reaction system, such as, but not limited to, the reactor (optionally including a reaction zone and a disengaging zone), catalyst regenerator, catalyst stripper, catalyst cooler, and/or any of the conduits that transport the catalyst composition between these units. In this embodiment, at least a portion of the molecular sieve catalyst composition to be stored contacts a fluidizing stream under conditions effective to transport the catalyst to the catalyst storage unit in a fluidized manner. The fluidizing stream optionally comprises one or more of at least a portion of the oxygen stream, at least a portion of the nitrogen stream or at least a portion of the compressed air stream from the ASU.

Once the catalyst composition is introduced into the catalyst storage unit, the catalyst composition optionally is blanketed with a blanketing medium comprising one or more streams derived from the ASU. For example, the blanketing medium optionally comprises one or more of at least a portion of the oxygen stream, at least a portion of the nitrogen stream or at least a portion of the compressed air stream from the ASU. Thus, the blanketing medium optionally is selected from the group consisting of at least a portion of the nitrogen stream, at least a portion of the oxygen stream, at least a portion of the compressed air stream, and combinations thereof. Blanketing the catalyst composition in the catalyst storage unit with one or more of the streams derived from the ASU is desirable because each of these streams is particularly dry, having been processed in the ASU to remove most if not all water therefrom, as discussed above. Dry blanketing mediums are preferred because it has been discovered that the molecular sieve catalyst compositions utilized for OTO conversion processes are hydrothermally unstable and may be deactivated in the presence of water. Preferably, the blanketing medium has a dew point of less than about −40° F. (−40° C.), more preferably less than about −60° F. (−51° C.), and most preferably less than about −90° F. (−68° C.).

3. ASU-Derived Stripping Medium

In another embodiment of the present invention, the OTO reaction system includes a stripping unit, which receives a stripping medium comprising one or more of the streams derived from the ASU, e.g., the oxygen stream, the nitrogen stream, the optional argon stream and/or the compressed air stream. In this embodiment, the stripping medium preferably comprises at least a portion of the nitrogen stream or at least a portion of the argon stream from the ASU. As indicated above, the streams derived from the ASU are substantially dry and are highly desirable stripping mediums due to the hydrothermal instability of typical catalysts employed in OTO conversion processes.

The flow rate of the stripping medium fed to the stripping unit may vary widely depending on the size of the OTO reaction unit. Ideally, the stripping medium has an oxygen to nitrogen weight ratio of from about 0.05 to about 10, preferably from about 0.1 to about 1.0, more preferably from about 0.2 to about 0.5 wt/wt.

Thus, with continuing reference to FIG. 3, at least a portion of the nitrogen stream 348 or at least a portion of the argon stream, not shown, is directed in this embodiment from the ASU 346 to the stripping unit 334 through line 335.

4. ASU-Derived Instrument Air

In another embodiment of the present invention, one or more of the streams derived from the ASU serve as instrument air and/or service air in the OTO reaction system. Specifically, in this embodiment, at least a portion of the ASU-derived stream expands or contracts a diaphragm associated with a valve actuator to cause the valve actuator to open or close a valve. In this embodiment, the ASU-derived stream comprises one or more of: at least a portion of the oxygen stream, at least a portion of the nitrogen stream, and/or at least a portion of the compressed air stream. Preferably, the ASU-derived stream comprises at least a portion of the compressed air stream.

The pressure of the compressed air stream may vary widely depending on the size and type of the valve actuator to be operated with the compressed air stream. In one embodiment, the pressure of the compressed air stream ranges from about 20 psia (138 kPaa) to about 300 psia (2069 kpaa), preferably from about 40 psia (276 kpaa) to about 200 psia (1379 kpaa), and most preferably from about 50 psia to about 150 psia. Thus, the compressed air stream preferably is bled from the main air compressor of the ASU, although it is contemplated that the compressed air stream could be bled from the booster air compressor of the ASU.

The valve to be operated by the valve actuator may control a variety of different process streams in the integrated OTO reaction system, which may include a methanol synthesis system and/or a polymerization unit, thereby affecting temperature, flow rate, pressure or any other characteristic readily controllable through use of a valve. As used herein, a "process stream" is any stream in a reaction system such as, for example, a feedstock stream, a reaction effluent stream, a regeneration medium stream, a fluidizing agent stream, a stripping medium stream, suction and/or discharge stream for gas compressors, or a heat exchanging medium stream (e.g., for heating of a reboiler stream or cooling in condensers and coolers). The process stream may be a liquid stream, a gaseous stream or a stream comprising both liquid and gaseous components. A "process gas stream" is any stream in a reaction system, which stream comprises gaseous components.

In one embodiment, for example, the valve controls temperature of a process stream by modulating the flow rate of a heat exchanging medium. In another embodiment, the valve is operable to control the temperature of the oxygenate before the oxygenate contacts a molecular sieve catalyst composition in a reactor under conditions effective to convert the oxygenate to light olefins. In another embodiment, the valve is operable to control pressure of a process gas stream. In another embodiment, the valve controls the flow rate of one or more process streams. In one embodiment, the one or more process streams comprise a heat exchanging medium that heats a reboiler stream. Additionally or alternatively, the one or more process streams comprise a heat exchanging medium that cools a condenser stream.

5. ASU-Derived Deriming Medium

In another embodiment of the present invention, one or more of the streams derived from the ASU serve as a deriming medium in the OTO reaction system. For purposes of this patent specification and the appended claims, "deriming," and variations thereof, means the process of removing accumulated water and/or carbon dioxide from equipment that operates under cryogenic conditions by heat and evaporation, sublimation or solution.

An OTO reaction system may include one or more turboexpanders. As used herein, a "turboexpander" is a device that converts pressure energy of a pressurized gas or liquid stream to mechanical energy as the gas or vapor expands through a turbine. As the gas or vapor expands through the turbine, the turboexpander may become very cold, thereby requiring deriming to maintain turboexpander efficiency. Thus, in one embodiment, the present invention includes a step of deriming a turboexpander in the reaction system by adding a portion of the nitrogen stream to the turboexpander.

Additionally, the OTO reaction system may include one or more cold boxes, which may require deriming. A "cold box," as used herein means an insulated structure, which insulates one or more plate-and-fin-type heat exchangers. The heat exchangers receive a plurality of process streams of different temperature, which streams exit the cold box at substantially the same temperature. For example, reverting to FIG. 2, heat exchanger 217, high pressure separation unit 218 and low pressure separation unit 219 preferably operate under cryogenic conditions and may be contained in a single cold box. In one embodiment of the present invention, the invention comprises a step of deriming a cold box in the reaction system by adding a portion of the nitrogen stream to the cold box.

6. Methanol Synthesis-Related ASU Uses

As indicated above, in one embodiment, the oxygenate in the OTO conversion process comprises methanol, and the integrated OTO reaction system comprises a methanol synthesis system. In one methanol synthesis reaction, natural gas contacts oxygen in a syngas generator under conditions effective to convert the natural gas to syngas. The syngas contacts a methanol synthesis catalyst in a methanol synthesis unit under conditions effective to convert the natural gas to methanol. In this embodiment, one or more streams derived from the ASU may be used in the methanol synthesis system. For example, in one preferred embodiment of the present invention, at least a portion of the oxygen stream from the ASU is directed to the syngas generator to serve as the oxygen source in the syngas generation step. This embodiment is discussed below with reference to FIG. 5.

As shown, in this embodiment, the OTO reaction system includes a methanol synthesis system, which receives one or more streams from an ASU 546. Additionally, the OTO reaction system includes a catalyst regenerator 538 that receives a regeneration medium comprising an oxygen stream derived from an ASU 346. As shown, an oxygenate such as methanol is directed through lines 500 to an OTO fluidized reactor 502 wherein the oxygenate is converted to light olefins and various by-products which are yielded from the fluidized reactor 502 in an olefin-containing stream in line 504. The olefin-containing stream in line 504 optionally comprises methane, ethylene, ethane, propylene, propane, various oxygenate byproducts, C4+ olefins, water and hydrocarbon components. The olefin-containing stream in line 504 is directed to a quench unit or quench tower 506 wherein the olefin-containing stream in line 504 is cooled and water and other readily condensable components are condensed.

The condensed components, which comprise water, are withdrawn from the quench tower 506 through a bottoms line 508. A portion of the condensed components are recycled through a line 510 back to the top of the quench tower 506. The components in line 510 preferably are cooled in a cooling unit, e.g., heat exchanger (not shown), so as to provide a cooling medium to cool the components in quench tower 506.

An olefin-containing vapor is yielded from the quench tower 506 through overhead stream 512. The olefin-containing vapor is compressed in one or more compressors 514 and the resulting compressed olefin-containing stream is optionally passed through line 516 to a water absorption unit 518. Methanol is preferably used as the water absorbent, and is fed to the top portion of the water absorption unit 518 through line 520. Methanol and entrained water, as well as some oxygenates, are separated as a bottoms stream through line 522. The light olefins are recovered through overhead line 524. Optionally, the light olefins are sent to an additional compressor or compressors (not shown), and then are input to a separation system 526, which optionally comprises one or more separation units such as distillation columns, absorption units, and/or adsorption units.

The separation system 526 separates the components contained in the overhead line 524. Thus, separation system 526 forms a light ends stream 527, optionally comprising methane, hydrogen and/or carbon monoxide; an ethylene-containing stream 528 comprising mostly ethylene; an ethane-containing stream 529 comprising mostly ethane; a propylene-containing stream 530 comprising mostly propylene; a propane-containing stream 531 comprising mostly propane; and one or more byproduct streams, shown as line 532, comprising one or more of the oxygenate byproducts, provided above, heavy olefins, heavy paraffins, and/or absorption mediums utilized in the separation process.

Figure 5:
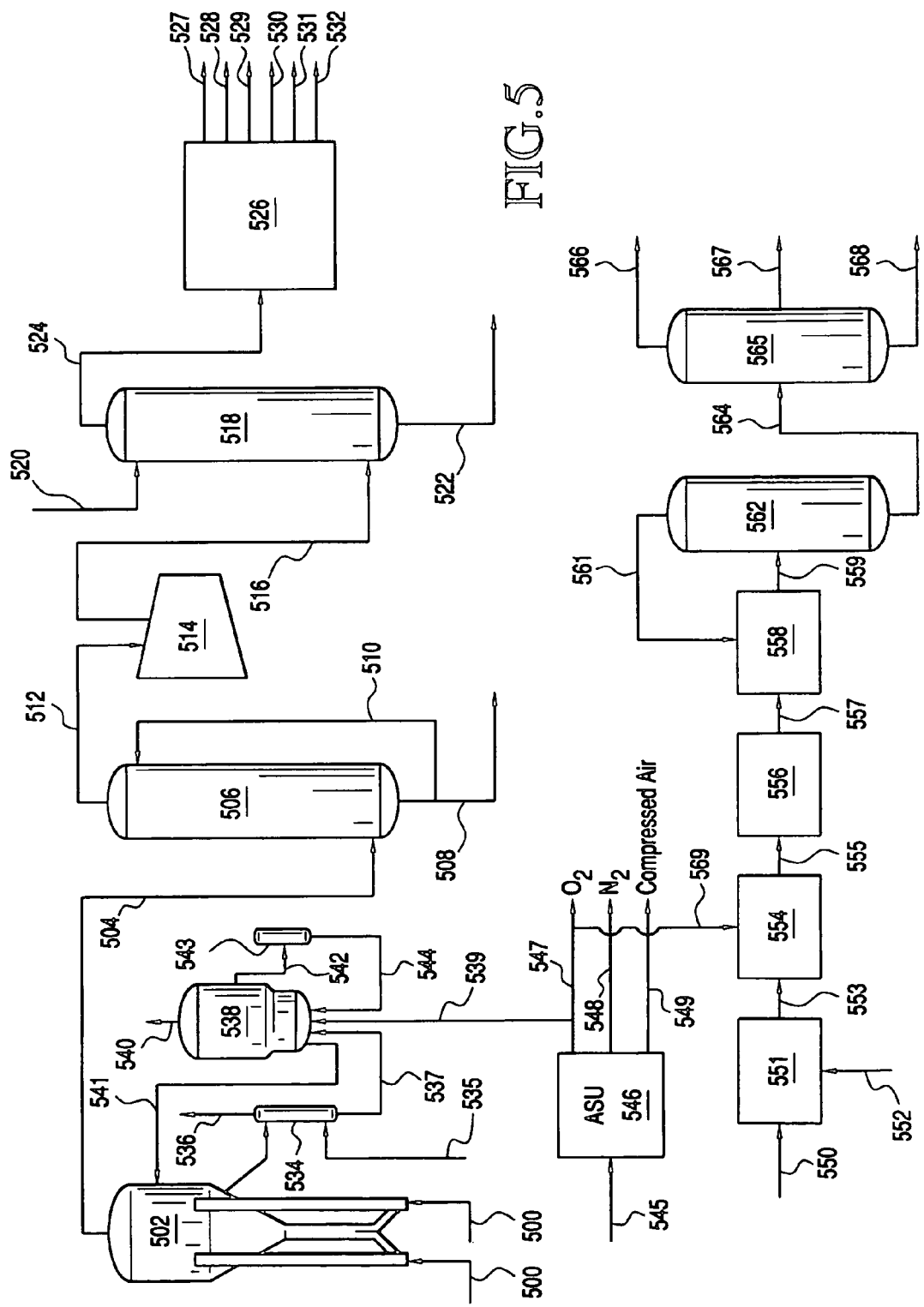
FIG. 5 presents a flow diagram illustrating an integrated oxygenate to olefin reaction system, methanol synthesis system and air separation unit according to one embodiment of the present invention.

FIG. 5 also illustrates a catalyst regeneration system, which is in fluid communication with fluidized reactor 502 and an ASU 546. As shown, at least a portion of the catalyst compositions contained in fluidized reactor 502 are withdrawn and transported, preferably in a fluidized manner, in conduit 533 from the fluidized reactor 502 to a catalyst stripper 534. In the catalyst stripper 534, the catalyst compositions contact a stripping medium, e.g., steam and/or nitrogen, under conditions effective to remove interstitial hydrocarbons from the molecular sieve catalyst compositions. As shown, stripping medium is introduced into catalyst stripper 534 through line 535, and the resulting stripped stream 536 is released from catalyst stripper 534. Optionally, all or a portion of stripped stream 536 is directed back to fluidized reactor 502.

During contacting of the oxygenate feedstock with the molecular sieve catalyst composition in the fluidized reactor 502, the molecular sieve catalyst composition may become at least partially deactivated. That is, the molecular sieve catalyst composition becomes at least partially coked. In order to reactivate the molecular sieve catalyst composition, the catalyst composition preferably is directed to a catalyst regenerator 538. As shown, the stripped catalyst composition is transported, preferably in the fluidized manner, from catalyst stripper 534 to catalyst regenerator 538 in conduit 537. Preferably, the stripped catalyst composition is transported in a fluidized manner through conduit 537.

In this embodiment of the present invention, the catalyst regenerator 538 is also in fluid communication with an ASU 546. As shown, ASU 546 receives an air stream 545. The ASU 546 processes air stream 545 as discussed above with reference to FIG. 2, for example, to form an oxygen stream 547, a nitrogen stream 548 and one or more compressed air streams 549. In a preferred embodiment of the present invention, at least a portion of the oxygen stream 547 is directed to the catalyst regenerator 538 to serve as the regeneration medium, as shown by line 539. Additionally or alternatively, at least a portion of the compressed air stream 549 and/or at least a portion of the nitrogen stream 548 is directed to the catalyst regenerator 538 in the regeneration medium.

In catalyst regenerator 538, the stripped catalyst composition contacts the regeneration medium under conditions effective (preferably including heating the coked catalyst) to at least partially regenerate the catalyst composition contained therein. As shown, the resulting regenerated catalyst compositions are ultimately transported, preferably in a fluidized manner, from catalyst regenerator 538 back to the fluidized reactor 502 through conduit 541. The gaseous combustion products are released from the catalyst regenerator 538 through flue gas stream 540. In another embodiment, not shown, the regenerated catalyst composition additionally or alternatively is directed, optionally in a fluidized manner, from the catalyst regenerator 538 to one or more of the fluidized reactor 502 and/or the catalyst stripper 534. In one embodiment, not shown, a portion of the catalyst composition in the reaction system is transported directly, e.g., without first passing through the catalyst stripper 534, optionally in a fluidized manner, from the fluidized reactor 502 to the catalyst regenerator 538.

As the catalyst compositions contact the regeneration medium in catalyst regenerator 538, the temperature of the catalyst composition may increase due to the exothermic nature of the regeneration process. As a result, it may be desirable to control the temperature of the catalyst composition by directing at least a portion of the catalyst composition from the catalyst regenerator 538 to a catalyst cooler 543. As shown, the catalyst composition is transported in a fluidized manner from catalyst regenerator 538 to the catalyst cooler 543 through conduit 542. The resulting cooled catalyst composition is transported, preferably in a fluidized manner from catalyst cooler 543 back to the catalyst regenerator 538 through conduit 544. In another embodiment, not shown, the cooled catalyst composition additionally or alternatively is directed, optionally in a fluidized manner, from the catalyst cooler 543 to one or more of the fluidized reactor 502 and/or the catalyst stripper 534.

As indicated above, in this embodiment, the OTO reaction system includes a methanol synthesis system, which is in fluid communication with the ASU 546. As shown, a feed stream 550, which preferably includes natural gas, is directed to a desulfirization unit 551. Prior to entering the desulfirization unit 551, the feed stream 550 optionally is compressed by one or more compressors, not shown, to facilitate movement of the feed stream 550 and various intermediate streams through the methanol synthesis system. In one embodiment, the natural gas from feed stream 550 contacts water from water stream 552 in the desulfurization unit 551 in a countercurrent manner under conditions effective to remove sulfur-containing components, e.g., $H_2S$ and/or mercaptans, therefrom. In this manner, the desulfurization unit 551 acts as an absorption unit. Additionally or alternatively, the desulfurization unit 551 may act as an adsorption unit. In this embodiment, the desulfurization unit 551 preferably includes one or more columns that are packed with molecular sieve particles, e.g., 3-5 angstrom molecular sieve particles, the pores of which are adapted to selectively capture the sulfur-containing components from natural gas stream 550. The optional adsorption unit optionally includes a regeneration system, not shown, for regenerating deactivated or partially deactivated molecular sieve particles. The desulfurization unit 551 forms desulfurized feed stream 553, which is directed to a reforming unit 554, which may be selected from the group consisting of a partial oxidation unit, a catalytic partial oxidation unit, an autothermal reforming unit, or a combination thereof.

The reforming unit 554 converts the natural gas in desulfurized feed stream 553 to syngas in syngas stream 555. Generally, the production of syngas involves a combustion reaction of natural gas, mostly methane, and an oxygen source, into hydrogen, carbon monoxide and/or carbon dioxide. In this embodiment of the present invention, the oxygen source is derived, at least in part, from the ASU. As shown, a portion of the oxygen stream 547 from the ASU is directed to the reforming unit 554 through line 569. Alternatively or alternatively, at least a portion of the nitrogen stream 548 and/or the compressed air stream 549 is directed to the reforming unit 554. Syngas production processes are well known, and include conventional steam reforming, partial oxidation reforming, catalytic partial oxidation reforming, autothermal reforming, or a combination thereof. Thus, reforming unit 554 may be a steam reforming unit, a partial oxidation unit, a catalytic partial oxidation unit, an autothermal reforming unit, and/or a combined reforming unit, e.g., a unit that combines two or more of these reforming processes.

In one embodiment, water from water stream 552 preferably increases the water content of, and more preferably saturates, the feed stream 550, in the process of removing sulfur-containing components. Additionally or alternatively, the desulfurized feed stream 553 is directed to a separate saturization unit, not shown, in which water contacts the desulfurized feed stream 553 under conditions effective to saturate the desulfurized feed stream 553 or increase the water content thereof. For example, the saturization unit may include a packed or tray column wherein water contacts the desulfurized feed stream 553 in a countercurrent manner under conditions effective to saturate or increase the water content of the desulfurized feed stream 553. Saturation of the feed stream 550 and/or desulfurized feed stream 553 is particularly beneficial if the reforming unit 554 implements a steam reforming process as a water-containing or saturated desulfurized feed stream 553 may be necessary in order for the steam reforming process to convert the desulfurized feed stream 553 to syngas in syngas stream 555. Additionally or alternatively, water may be injected directly into the reforming unit 554, particularly if the reforming unit 554 provides a steam reforming process. Resulting syngas stream 555 is directed to a compression zone 556, wherein the syngas stream 555 is compressed in one or more stages to form compressed stream 557. Preferably, the compression zone 556 includes one or more centrifugal compressors. Compressed stream 557 is then directed to a methanol synthesis unit 558, wherein the syngas in compressed stream 557 contacts a methanol synthesis catalyst under conditions effective to convert at least a portion of the syngas to crude methanol in crude methanol stream 559. Optionally, unreacted syngas from methanol synthesis unit 558 is recycled to compression zone 556 as shown by unreacted syngas stream 560.

The crude methanol in crude methanol stream 559 includes light ends, methanol, water, and fusel oil. Preferably, the crude methanol stream 559 is treated with a caustic medium, not shown, in a caustic wash unit, not shown, under conditions effective to increase the pH of the crude methanol stream 559. As a result, the crude methanol stream 559 also optionally includes dissolved caustic salts. As shown, crude methanol stream 559 is directed to a separation zone, which is adapted to separate one or more of these components and isolate a relatively pure methanol stream. The separation zone includes a light ends separation unit 562, such as a topping column, and a refining column 565. Crude methanol stream 559 is first directed to the light ends separation unit 562, wherein conditions are effective to separate the crude methanol stream 559 into light ends stream 561 and bottoms crude methanol stream 564, which contains methanol, water, fusel oil, and optionally dissolved caustic salts. At least a portion of the light ends stream 561 preferably is recycled to methanol synthesis unit 558, as shown, for further conversion to methanol while the bottoms crude methanol stream 564 is directed to refining column 565 for further processing. In refining column 565, the bottoms crude methanol stream 564 is subjected to conditions effective to separate the bottoms crude methanol stream 564 into a refined methanol stream 566, a fusel oil stream 567, and a water stream 568. A majority of the caustic salts, if any, from bottoms crude methanol stream 564 are dissolved in water stream 568. In one preferred embodiment, not shown, at least a portion of the refined methanol stream 566 is directed to the fluidized reactor 502 through lines 500 to serve as the oxygenate source of the OTO conversion process occurring in fluidized reactor 502.

In another embodiment, the methanol synthesis system comprises a sulfur removal system, preferably a Claus sulfur recovery system. As used herein, a sulfur removal system removes elemental sulfur as well as compounds containing sulfur. For example, the natural gas may comprise $H_2S$, which preferably is removed from the natural gas prior to introduction into the syngas generator of the methanol synthesis system. Optionally, one or more streams from the ASU may be utilized in the sulfur removal system. In this embodiment, the invention comprises separating a majority of the $H_2S$ from the natural gas to form a separated $H_2S$-containing stream. Separation of the $H_2S$ from the natural gas stream to form the separated $H_2S$-containing stream preferably occurs by chemical absorption with a caustic or amine solution. The separated $H_2S$-containing stream then contacts a portion of the oxygen stream from the ASU and/or a portion of the compressed air stream from the ASU under conditions effective to convert a portion of the $H_2S$ in the separated $H_2S$-containing stream to $SO_2$. The formation of $SO_2$ occurs in a burner enclosed within a boiler or furnace. The reaction conditions for the formation of $SO_2$ preferably comprise a temperature of from about 1500° F. (816° C.) to about 2912° F. (1600° C.) and a pressure of from about 1 psig (138 kPag) to about 350 psig (2413 kpag). The reaction may be shown as follows:

$$H_2S + O_2 \rightleftharpoons SO_2 + H_2 \tag{VII}$$

The $SO_2$ thus formed then contacts residual $H_2S$ in the presence of a catalyst composition, e.g., an activated alumina, under conditions effective to form elemental sulfur and water. The reaction conditions for this reaction preferably comprise a reaction temperature of from about 260° F. (127° C.) to about 650° F. (343° C.) and a pressure of from about 0.5 psig (3.4 kPag) to about 350 psig (2,413 kpag). This reaction may be shown as follows:

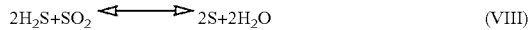
$$2H_2S + SO_2 \rightleftharpoons 2S + 2H_2O \tag{VIII}$$

The elemental sulfur and water are easily separable from the $H_2S$-containing stream as the sulfur condenses while the water remains as a vapor and exits with the tail gas, which optionally is processed in a Tail Gas Clean-Up Unit (a SCOT reactor) and an amine system.

7. ASU-Derived Blanketing Mediums

As indicated above, the molecular sieve catalyst compositions implemented in the OTO conversion process may exhibit hydrothermal instability. During reactor down times, e.g., during repair or ordinary maintenance of the OTO reactor, it may be desirable to store the molecular sieve catalyst composition in an environment substantially free of water. Thus, in one embodiment of the present invention, at least a portion of the molecular sieve catalyst composition is stored in a catalyst storage unit. In the catalyst storage unit, the molecular sieve catalyst composition is blanketed with a substantially dry blanketing medium. The blanketing medium optionally is selected from the group consisting of at least a portion of the nitrogen stream, at least a portion of the oxygen stream, at least a portion of the compressed air stream, and combinations thereof. Preferably, the blanketing medium comprises at least a portion of the nitrogen stream from the ASU.

In one embodiment of the present invention, the light olefins formed in the OTO reaction system are directed to a polymerization unit. At least a portion of the light olefins contact a polymerization catalyst in the polymerization unit under conditions effective to form a polymer. The polymer may comprise one or more volatile compounds. As used herein, "volatile compounds" means compounds having a boiling point or sublimation point that is less than −40° C. For example, the one or more volatile compounds may be selected from the group consisting of: hydrogen, ethylene and propylene. In one embodiment of the present invention, the polymer contacts at least a portion of the nitrogen stream from the ASU under condition effective to remove volatile compounds from the polymer. The nitrogen stream from the ASU is particularly desirable for volatile component removal as nitrogen does not further contaminate the polymer because it does not react with the polymer, absorb with the polymer, or condense at polymer handling conditions.

Additionally, when it is initially formed, the polymer is relatively hot and reactive. For example, an initially formed polymer may react with one or more components in the atmosphere causing the polymer to develop undesirable characteristics. In one embodiment of the present invention, the nitrogen stream from the ASU serves as a blanketing medium for the polymer. Specifically, in this embodiment, at least a portion of the light olefins contact a polymerization catalyst under conditions effective to form a polymer. The polymer is blanketed with at least a portion of the nitrogen stream from the ASU. Optionally, the polymer is extruded and cut into pellets and the nitrogen stream blankets the polymer pellets.

8. ASU-Derived Feedstock Diluent

As indicated above, the oxygenate-containing feedstock that is directed to an OTO reaction system optionally comprises one or more diluents. In one embodiment, the diluent comprises one or more streams from an ASU. Preferably, the diluent comprises at least a portion of the nitrogen stream from the ASU and/or at least a portion of the argon stream from the ASU. Thus, with continuing reference to FIG. 3, at least a portion of the nitrogen stream 348 and/or at least a portion of the optional argon stream, not shown, from the ASU 346 is directed from the ASU 346 to the fluidized reactor 302, preferably through lines 300.

In another embodiment, the light olefins formed in the OTO reaction system are combined with a diluent and directed to an integrated (or non-integrated) polymerization system. In this embodiment, the polymerization diluent optionally comprises one or more streams from an ASU. Preferably, the polymerization diluent comprises at least a portion of the nitrogen stream from the ASU, and/or at least a portion of the argon stream from the ASU. Thus, in this embodiment, the invention comprises a process for forming a polymer. In this process, air components are separated in an ASU to form an oxygen stream and a nitrogen stream. The ASU unit also optionally forms a compressed air stream. An oxygenate contacts a molecular sieve catalyst composition in an OTO reaction system under conditions effective to convert the oxygenate to light olefins. An effluent stream comprising the light olefins is yielded from the OTO reaction system. At least a portion of the nitrogen stream is combined with at least a portion of the effluent stream to form a polymerization feedstock. A polymerization catalyst contacts the polymerization feedstock in a polymerization unit under conditions effective to form the polymer.

9. ASU Derived Streams for Waste Water Treatment

As indicated above, the OTO reaction process forms a substantial amount of byproduct water, which is yielded from the OTO reaction system in a water-containing effluent stream, optionally derived from the bottoms stream of an OTO reaction system quenching unit or quench tower. For example, in one preferred embodiment, the water-containing effluent stream is derived from an oxygenates recovery unit, which operates on the bottoms stream from the quenching unit. The oxygenates recovery unit ideally comprises one or more distillation columns which are adapted to recover the bulk of the oxygenate contaminants in an overhead stream (which optionally is recycled to the OTO reactor(s)) and a water-enriched bottoms stream.

The water-containing effluent stream (whether derived from a quenching unit or an oxygenates recovery unit) may comprise contaminants such as oxygenated hydrocarbons as well as aliphatic, aromatic and cyclic hydrocarbons, and possibly a minor amount of inorganic contaminants. The water-containing effluent stream may also contain trace levels of nitrogen containing species, e.g., less than about 1,200 mg/l. In order to meet certain environmental quality goals, it may be necessary to direct the water-containing effluent stream to a waste water treatment plant to remove contaminants therefrom prior to disposal.

Various water treatment processes are well known in the art and are described, for example, in U.S. Pat. Nos. 3,356,609, 3,968,036, 4,479,876, 5,308,492, 5,332,502, and WO 03/106, 346, the entireties of which are incorporated herein by reference. Preferably, the water treatment plant comprises a biological treatment system, which employs one or more naturally occurring, living and reproducing microorganisms, optionally selected from the group consisting of: bacteria, protozoa, fungi and algae. These microorganisms use the undesired contaminants in the water-containing effluent stream as food, as an energy source or as nutrients. Biological treatment systems, whether in the form of controlled bioreactors (e.g., of the activated sludge type) or simple, naturally aerated lagoons or ponds, require two key capabilities in design: a biological reaction zone and a biomass/suspended solids settling zone, both of which are well-known in the art.

Different types of biological treatment systems are favored depending on the oxygen demand or dissolved organic reduction requirements for a particular application. Types of biological systems include: aerobic suspended growth systems, aerobic attached systems, anaerobic systems, and anoxic systems. In an aerobic systems, the treatment process is active in the presence of dissolved oxygen. In wastewater treating this refers to a microbiological system in which microorganisms use dissolved oxygen in the metabolism (removal) of contaminants. In an anaerobic system, the treatment process is active in the absence of dissolved oxygen. In wastewater treating this refers to a microbiological system in which microorganisms metabolize (remove) contaminants in the absence of dissolved oxygen. In an anoxic system, the treatment process is active in the absence of dissolved oxygen but in the presence of nitrate.

Types of facilities include: suspended growth systems, attached growth systems, or a combination of both. There are several varieties of suspended growth systems, the most common being activated sludge and extended aeration systems. An attached growth system may include one or more trickling filters and rotating biological contactors.

Aerobic treatment systems are preferred according to the present invention. In aerobic systems, the proper environment (dissolved oxygen) is maintained by the use of diffused or mechanical aeration, which also serves to keep the system well mixed. The microorganisms utilize the dissolved substances to obtain energy and, in presence of oxygen and nutrients, convert them to carbon dioxide, water, and more organisms.

One particularly preferred water treatment system for this embodiment is referred to as the UNOX®/LINDOX® water treatment process. See, e.g., Wilcox et al., "The UNOX System-Oxygen Aeration in the Activated Sludge Process," J. Amer. Chem. Soc., 10/1971, pp. 408A-424A, the entirety of which is incorporated herein by reference. The UNOX®/LINDOX® process is an activated sludge process with oxygen aeration in covered, staged bioreactors. The process includes an oxygen blown aerobic digester (reactor). The aerobic digester reduces total organic carbon and nitrogen compounds by aeration. Benefits of the process include low space requirements, high space-time yields, low energy consumption and minimum off-gas rates. The process requires oxygen, which according to the present invention may be delivered to the waste water treatment facility from the ASU.

In one embodiment, the process of the present invention includes a step of directing at least a portion of the oxygen stream or the compressed air stream from the air separation unit to an aerobic water treatment system for removing contaminants from a water-containing effluent stream. Thus, in another embodiment, the invention is to an integrated reaction system which includes an aerobic water treatment system in fluid communication with the air separation unit. The aerobic water treatment system receives at least a portion of the oxygen stream or at least a portion of the compressed air stream from the air separation unit, and removes one or more contaminants from the water-containing effluent stream, which optionally is derived from the bottoms stream of a quench unit.

F. Integrated Reaction Systems

In one aspect of the present invention, the invention is directed to various integrated reaction systems for regenerating catalyst, for forming light olefins and for forming polymers.

In one embodiment, for example, the invention is to an integrated reaction system for forming light olefins. This system includes an air separation unit comprising one or more separation columns for separating air into an oxygen stream and a nitrogen stream, wherein the air separation unit also forms a compressed air stream. The system also includes a syngas generator in fluid communication with the air separation unit and in which natural gas contacts at least a portion of the oxygen stream under conditions effective to convert the natural gas to syngas. The system also includes a methanol synthesis unit in fluid communication with the syngas generator, wherein the syngas contacts a first catalyst composition in the methanol synthesis unit under conditions effective to convert at least a portion of the syngas to methanol. Additionally, the system includes a methanol-to-olefins reaction unit in fluid communication with the methanol synthesis unit, wherein the methanol contacts a molecular sieve catalyst composition in the methanol-to-olefins reaction unit under conditions effective to convert the methanol to light olefins and to form an at least partially coked molecular sieve catalyst composition. The integrated reaction system also includes a catalyst regenerator in fluid communication with the methanol-to-olefins reaction unit. The at least partially coked molecular sieve catalyst composition contacts a regeneration medium in the catalyst regenerator under conditions effective to convert the at least partially coked molecular sieve catalyst composition to a regenerated molecular sieve catalyst composition. The catalyst regenerator is in fluid communication with the air separation unit, and the regeneration medium comprises at least a portion of the oxygen stream or at least a portion of the compressed air stream.

Optionally, the regeneration medium further comprises at least a portion of the nitrogen stream. The system may include a conduit for delivering regenerated catalyst from the catalyst regenerator to the methanol-to-olefins reaction unit, wherein the conduit comprises a fluidizing opening for receiving a fluidizing stream from the air separation unit. The regenerated molecular sieve catalyst composition contacts the fluidizing stream in the conduit under conditions effective to transport the regenerated molecular sieve catalyst composition in a fluidized manner from the catalyst regenerator to the methanol-to-olefins reaction unit. The fluidizing stream comprises at least a portion of the nitrogen stream.

Preferably, the methanol-to-olefins reaction unit comprises a reaction zone and a disengaging zone. In this embodiment, the system includes a standpipe for transporting catalyst from the disengaging zone to the reaction zone. The standpipe comprises a fluidizing opening for receiving a fluidizing stream from the air separation unit. The molecular sieve catalyst composition contacts the fluidizing stream in the standpipe under conditions effective to transport the molecular sieve catalyst composition in a fluidized manner from the disengaging zone to the reaction zone. The fluidizing stream comprises at least a portion of the nitrogen stream from the ASU.

Optionally, a conduit, which comprises a fluidizing opening for receiving a fluidizing stream from the air separation unit, directs the at least partially coked molecular sieve catalyst composition from the disengaging zone to the catalyst regenerator. The at least partially coked molecular sieve catalyst composition contacts the fluidizing stream in the conduit under conditions effective to transport the at least partially coked molecular sieve catalyst composition in a fluidized manner from the disengaging zone to the catalyst regenerator. The fluidizing stream comprises at least a portion of the oxygen stream, at least a portion of the nitrogen stream and/or at least a portion of the compressed air stream.

In one embodiment, the system includes a valve actuator in fluid communication with the ASU. The valve actuator receives a portion of the compressed air stream such that the valve actuator is operable to open or close a valve. Any of a number of valves may be controlled by the valve actuator. For example, the valve may control the temperature of a process stream by modulating the flow rate of a heat exchanging medium. Alternatively, the valve may be operable to control pressure of a process gas stream. Alternatively, the valve controls the flow rate of one or more process streams in the integrated reaction system.

In this embodiment, the system optionally further comprises a conduit for directing the methanol from the methanol synthesis unit to the methanol-to-olefins reaction unit. The one or more process streams comprise the methanol that is directed to the methanol-to-olefins reaction unit. Optionally, the system further comprises an oxygenate recovery unit for recovering an oxygenate from the effluent stream and to form an oxygenate-containing stream, wherein the one or more process streams comprise the oxygenate-containing stream. The may system further include a conduit directing the oxygenate-containing stream from the oxygenate recovery unit to the methanol-to-olefins reaction unit.

In another embodiment, the system further includes a heat exchanger for heating a reboiler stream with a heat exchanging medium, wherein the one or more process streams comprise the heat exchanging medium. Alternatively, the system includes a heat exchanger for cooling a condenser stream with a heat exchanging medium, wherein the one or more process streams comprise the heat exchanging medium.

Optionally, the integrated reaction system includes a polymerization unit in fluid communication with the methanol-to-olefins reaction unit. At least a portion of the light olefins contacts a polymerization catalyst in the polymerization unit under conditions effective to form a polymer. In this embodiment, the system optionally includes a volatile component removal unit in fluid communication with the polymerization unit and the air separation unit. The polymer contacts at least a portion of the nitrogen stream received from the air separation unit under conditions effective to remove volatile components from the polymer.

Additionally or alternatively, the system includes an extruder in fluid communication with the polymerization unit for extruding the polymer to form an extruded polymer. A cutting device is in fluid communication with the extruder for cutting the extruded polymer to form polymer pellets. A blanketing unit is in fluid communication with the air separation unit and the cutting device. The polymer pellets are blanketed with at least a portion of the nitrogen stream from the ASU. A cooling unit is in fluid communication with the blanketing unit for cooling the polymer pellets.

In one embodiment, the system includes an adsorption unit wherein an effluent stream, which comprises the light olefins from the methanol-to-olefins reaction unit and a polymerization catalyst poison, contacts a molecular sieve particle under conditions effective to adsorbatively remove the polymerization catalyst poison therefrom and to form a poison-containing molecular sieve particle. The adsorption unit is in fluid communication with the methanol-to-olefins reaction unit. A regeneration unit is in fluid communication with the air separation unit and the adsorption unit. In the regeneration unit, the poison-containing molecular sieve particle contacts at least a portion of the nitrogen stream under conditions effective to regenerate the poison-containing molecular sieve particle.

In another embodiment, the natural gas includes $H_2S$, and the system includes an absorption unit wherein a majority of the $H_2S$ is removed from the natural gas to form a separated $H_2S$-containing stream. The system also includes an $SO_2$ synthesis unit in fluid communication with the absorption unit. The separated $H_2S$-containing stream contacts a portion of the oxygen stream and/or a portion of the compressed air stream under conditions effective to convert a portion of the $H_2S$ in the separated $H_2S$-containing stream to $SO_2$. The system also includes a sulfur synthesis unit in fluid communication with the air separation unit and the $SO_2$ synthesis unit. The $SO_2$ contacts residual $H_2S$ in the presence of a catalyst composition under conditions effective to form elemental sulfur and water, which may be easily removed from the system through processes well-known in the art.

In another embodiment, the system includes a turboexpander in fluid communication with the air separation unit. The turboexpander is derimable by adding a portion of the nitrogen stream to the turboexpander. Additionally or alternatively, the system includes a cold box in fluid communication with the air separation unit. The cold box also is derimable by adding a portion of the nitrogen stream to the cold box.

While the present invention has been described and illustrated by e to particular embodiments, those of ordinary skill in the art will te that the invention lends itself to variations not necessarily illustrated For this reason, then, reference should be made solely to the appended for purposes of determining the true scope of the present invention.

We claim:

1. A process for regenerating catalyst in a reaction system, wherein the process comprises the steps of:
    (a) contacting an oxygenate with a molecular sieve catalyst composition in a reactor under conditions effective to convert the oxygenate to light olefins and to form an at least partially coked molecular sieve catalyst composition;
    (b) directing the at least partially coked molecular sieve catalyst composition from the reactor to a catalyst regenerator;
    (c) separating air into one or more of its components, using an air separation unit, to form at least two streams comprising an oxygen stream containing at least about 95 wt % oxygen, at least a portion of which is used as an oxygen-containing regeneration medium, and a nitrogen-containing stream containing at least about 95 wt % nitrogen;
    (d) directing the oxygen-containing regeneration medium from the air separation unit to the catalyst regenerator;
    (e) contacting the regeneration medium with the at least partially coked molecular sieve catalyst composition in the catalyst regenerator under conditions effective to at least partially regenerate the at least partially coked molecular sieve catalyst composition and form a regenerated catalyst composition; and
    (f) directing the regenerated catalyst composition from the catalyst regenerator to the reactor,
    wherein at least a portion of at least one of the oxygen stream and the nitrogen-containing stream is directed to a portion of the reaction system other than the regenerator.

2. The process of claim 1, wherein the air separating step comprises a cryogenic separation, such that the air separation unit comprises a cryogenic air separation unit, and wherein the regeneration medium has a temperature of from about 16°

C. to about 149° C. at a point immediately before the regeneration medium is introduced into the catalyst regenerator.

3. The process of claim 2, wherein the regeneration medium has a temperature of from about 27° C. to about 93° C. at a point immediately before the regeneration medium is introduced into the catalyst regenerator.

4. The process of claim 1, wherein the separation of air in the air separation unit further comprises forming a compressed air stream.

5. The process of claim 2, wherein the regeneration medium farther comprises at least a portion of the nitrogen stream.

6. The process of claim 2, wherein step (f) comprises contacting the regenerated molecular sieve catalyst composition with a fluidizing stream under conditions effective to transport the regenerated molecular sieve catalyst composition in a fluidized manner from the catalyst regenerator to the reactor, wherein the fluidizing stream comprises at least a portion of the nitrogen stream.

7. The process of claim 2, wherein the reactor comprises a reaction zone and a disengaging zone, wherein the process further comprises the steps of:
  (a) directing the molecular sieve catalyst composition from the reaction zone to the disengaging zone;
  (b) yielding an olefin-containing effluent stream from the disengaging zone;
  (c) directing the molecular sieve catalyst composition from the disengaging zone to a standpipe, which is in fluid communication with the reaction zone; and
  (d) contacting the molecular sieve catalyst composition with a fluidizing stream in the standpipe under conditions effective to transport the molecular sieve catalyst composition in a fluidized manner from the standpipe to the reaction zone, wherein the fluidizing stream comprises at least a portion of the nitrogen stream.

8. The process of claim 7, wherein the effluent stream further comprises a polymerization catalyst poison, the process further comprising the steps of:
  (a) contacting at least a portion of the effluent stream with a molecular sieve particle under conditions effective to adsorptively remove the polymerization catalyst poison therefrom and to form a poison-containing molecular sieve particle; and
  (b) contacting the poison-containing molecular sieve particle with at least a portion of the nitrogen stream under conditions effective to regenerate the poison-containing molecular sieve particle.

9. The process of claim 7, wherein the effluent stream further comprises an unsaturated compound selected from the group consisting of acetylene, methyl acetylene, butadiene and propadiene, the process further comprising the steps of:
  (a) contacting the unsaturated compound with a metal activated catalyst and a hydrogenation medium under conditions effective to hydrogenate the unsaturated compound and to form an at least partially coked metal activated catalyst; and
  (b) contacting the at least partially coked metal activated catalyst with a second regeneration medium under conditions effective to convert the at least partially coked metal activated catalyst to a regenerated metal activated catalyst, wherein the second regeneration medium comprises at least a portion of the oxygen stream or at least a portion of the compressed air stream.

10. The process of claim 2, wherein the reactor comprises a reaction zone and a disengaging zone, and wherein step (b) comprises directing the at least partially coked molecular sieve catalyst from the disengaging zone to the catalyst regenerator.

11. The process of claim 2, wherein the process further comprises the step of:
  (a) operating a valve actuator with a portion of the compressed air stream such that the valve actuator is operable to open or close a valve.

12. The process of claim 11, wherein the valve controls temperature of a process stream by modulating the flow rate of a heat exchanging medium.

13. The process of claim 12, wherein the valve is operable to control the temperature of the oxygenate before step (a).

14. The process of claim 11, wherein the valve is operable to control pressure of a process gas stream.

15. The process of claim 11, wherein the valve controls the flow rate of one or more process streams.

16. The process of claim 15, wherein the one or more process streams comprise a heat exchanging medium that heats a reboiler stream.

17. The process of claim 15, wherein the one or more process streams comprise a heat exchanging medium that cools a condenser stream.

18. The process of claim 2, wherein the oxygenate comprises methanol, the process further comprising the steps of:
  (a) contacting natural gas with at least a portion of the oxygen stream in a syngas generator under conditions effective to convert the natural gas to syngas; and
  (b) contacting the syngas with a methanol synthesis catalyst in a methanol synthesis unit under conditions effective to convert at least a portion of the syngas to the methanol.

19. The process of claim 18, wherein the natural gas comprises $H_2S$, the process further comprising the steps of:
  (a) separating a majority of the $H_2S$ from the natural gas to form a separated $H_2S$-containing stream;
  (b) contacting the separated $H_2S$-containing stream with a portion of the oxygen stream or with a portion of the compressed air stream under conditions effective to convert a portion of the $H_2S$ in the separated $H_2S$-containing stream to $SO_2$; and
  (c) contacting the $SO_2$ with residual $H_2S$ in the presence of a catalyst composition under conditions effective to form elemental sulfur and water.

20. The process of claim 18, wherein the natural gas comprises water, the process further comprising the steps of:
  (a) contacting at least a portion of the natural gas with a molecular sieve particle under conditions effective to adsorptively remove the water therefrom and form a water-containing molecular sieve particle; and
  (b) contacting the water-containing molecular sieve particle with at least a portion of the nitrogen stream under conditions effective to regenerate the water-containing molecular sieve particle.

21. The process of claim 2, wherein the process further comprises the steps of:
  (a) contacting at least a portion of the light olefins with a polymerization catalyst under conditions effective to form a polymer; and
  (b) contacting the polymer with at least a portion of the nitrogen stream under condition effective to remove volatile compounds from the polymer.

22. The process of claim 2, wherein the process further comprises the steps of:
  (a) contacting at least a portion of the light olefins with a polymerization catalyst under conditions effective to form a polymer; and (b) blanketing the polymer with at least a portion of the nitrogen stream.

23. The process of claim 22, wherein the polymer comprises polymer pellets.

24. The process of claim 2, wherein the process further comprises the step of:
(a) deriming a turboexpander in the reaction system by adding a portion of the nitrogen stream to the turboexpander.

25. The process of claim 2, wherein the process further comprises the step of:
(a) deriming a cold box in the reaction system by adding a portion of the nitrogen stream to the cold box.

26. The process of claim 2, wherein the process further comprises the step of:
(a) contacting at least a portion of the molecular sieve catalyst composition with a fluidizing stream under conditions effective to transport at least a portion of the molecular sieve catalyst composition in a fluidized manner from the reaction system to a catalyst storage unit, wherein the fluidizing stream comprises one or more of at least a portion of the oxygen stream, at least a portion of the nitrogen stream or at least a portion of the compressed air stream.

27. The process of claim 26, wherein the process further comprises the step of:
(a) blanketing at least a portion of the molecular sieve catalyst composition in the catalyst storage unit with a blanketing medium selected from the group consisting of at least a portion of the nitrogen stream, at least a portion of the oxygen stream, at least a portion of the compressed air stream, and combinations thereof.

28. The process of claim 2, wherein the process further comprises the step of:
(a) directing at least a portion of the oxygen stream or the compressed air stream from the air separation unit to an aerobic water treatment system for removing contaminants from a water-containing effluent stream.

* * * * *